(12) United States Patent
Park et al.

(10) Patent No.: US 11,222,445 B2
(45) Date of Patent: Jan. 11, 2022

(54) INPUT APPARATUS FOR DISPLAYING A GRAPHIC CORRESPONDING TO AN INPUT TOUCH COMMAND AND CONTROLLING METHOD THEREFOR

(71) Applicant: SAMSUNG ELECTRONICS CO., LTD., Suwon-si (KR)

(72) Inventors: Jeong Hyun Park, Suwon-si (KR); Young Ran Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/759,249

(22) PCT Filed: Oct. 26, 2018

(86) PCT No.: PCT/KR2018/012789
§ 371 (c)(1),
(2) Date: Apr. 24, 2020

(87) PCT Pub. No.: WO2019/083313
PCT Pub. Date: May 2, 2019

(65) Prior Publication Data
US 2020/0372689 A1      Nov. 26, 2020

(30) Foreign Application Priority Data
Oct. 26, 2017   (KR) .......................... 10-2017-0140311

(51) Int. Cl.
*G06T 11/00*      (2006.01)
*G01J 3/02*       (2006.01)
(Continued)

(52) U.S. Cl.
CPC ........... *G06T 11/001* (2013.01); *G01J 3/0229* (2013.01); *G01J 3/50* (2013.01); *G06F 3/03545* (2013.01); *G06F 3/0416* (2013.01); *G06F 3/0421* (2013.01)

(58) Field of Classification Search
CPC .. G06F 3/0416; G06F 3/0488; G06F 3/04162; G06F 3/00; G06F 3/0354;
(Continued)

(56) References Cited

U.S. PATENT DOCUMENTS

2017/0329421 A1* 11/2017 Kuscher .............. G06F 3/04883

FOREIGN PATENT DOCUMENTS

JP      2001-67183 A      3/2001
JP      2002-278703 A     9/2002
(Continued)

OTHER PUBLICATIONS

International Search Report dated Feb. 13, 2019 issued by the International Searching Authority in counterpart International Application No. PCT/KR2018/012789 (PCT/ISA/210).

*Primary Examiner* — Yaron Cohen
(74) *Attorney, Agent, or Firm* — Sughrue Mion, PLLC

(57) ABSTRACT

Embodiments of the disclosure relate to an input apparatus and a controlling method thereof, more particularly, to an input device for displaying a graphic in a detected color and an input touch form by detecting a color and a touch shape of an input tool for inputting a touch command. An input apparatus according to an embodiment includes a display: a first sensor configured to detect a touch position of a touch command input to the display from an input tool; a second sensor configured to detect a color of the input tool; and a controller configured to control a graphic corresponding to the input touch command to be displayed in the detected color at the detected touch position.

13 Claims, 20 Drawing Sheets

(51) Int. Cl.
 *G01J 3/50* (2006.01)
 *G06F 3/0354* (2013.01)
 *G06F 3/041* (2006.01)
 *G06F 3/042* (2006.01)

(58) Field of Classification Search
 CPC .. G06F 3/03545; G06F 3/0484; G06F 3/0421; G06F 2203/04807; G06T 7/90; G06T 11/00; G06T 11/001; G01J 3/50; G01J 3/0229
 See application file for complete search history.

(56) References Cited

FOREIGN PATENT DOCUMENTS

| | | | |
|---|---|---|---|
| KR | 10-2007-0053978 | A | 5/2007 |
| KR | 10-2013-0076166 | A | 7/2013 |
| KR | 10-2014-0091502 | A | 7/2014 |

\* cited by examiner

INPUT APPARATUS FOR DISPLAYING A GRAPHIC CORRESPONDING TO AN INPUT TOUCH COMMAND AND CONTROLLING METHOD THEREFOR

TECHNICAL FIELD

Embodiments of the disclosure relate to an input apparatus and a controlling method thereof, and more specifically, to an input apparatus that displays a graphic detected color and input touch shape by detecting the color and touch shape of a touch tool which inputs a touch command.

BACKGROUND ART

A display apparatus is a device for processing an image signal/image data input from the outside or stored therein by various processes and displaying the image on a display panel or screen. According to the method, it is variously implemented as a TV, a monitor, a portable media player, and the like.

The development of display technology, such as the increase of screen size, decrease in weight, and thickness of display devices, has expanded the field of application to the use of blackboards for classes and presentations as well as the field of TVs, monitors, and portable media playback devices. When the display apparatus is used for the purpose of the blackboard, it may be implemented as an electronic blackboard system having a pen device for touching the display panel.

The electronic blackboard belonging to a display category called a large format display (LFD) is an electronic device to replace conventional blackboards/white boards, and is a device that displays contents written by a user touching an object on a display surface on a screen. Such electronic boards are becoming more and more common due to their flexibility and visual effects.

The electronic blackboard system senses coordinates touched on the panel or screen by the pen device and displays a picture corresponding to the sensed coordinates on the panel or screen. The electronic blackboard system is implemented in various ways, for example, by implementing a display panel as a pressure-sensitive touch screen to sense pressure on the panel by the pen device and to form an image on the screen by a light beam projected from the pen device, by implementing a method of detecting light coordinates with a charge coupled device (CCD) camera, an infrared signal discharged on a plasma display panel (PDP) type display panel, and by implementing a method using the pen device for detecting the same.

However, the electronic blackboard has been inconvenient to use to designate a function to be performed by touch. In particular, when the user wants to write in various colors on the electronic blackboard, the importance of a technology of inputting a color through the pen device and displaying the writing content on the screen in the input color is being emphasized.

Disclosure

Technical Problem

An input apparatus and a controlling method thereof for receiving a touch command, wherein the input touch command is displayed according to a color and a touch shape of an input tool for inputting the touch command, thereby allowing a user to input the touch command in various colors and shapes.

Technical Solution

In accordance with an aspect of the disclosure, an input apparatus includes a display: a first sensor configured to detect a touch position of a touch command input to the display from an input tool; a second sensor configured to detect a color of the input tool; and a controller configured to control a graphic corresponding to the input touch command to be displayed in the detected color at the detected touch position.

Also, the second sensor may include a color sensor configured to obtain color information by recognizing the color of the input tool, and the color sensor includes at least one of a camera, a color filter, and a photodiode.

The controller may determine a color of a predetermined area of the input tool as the color displayed at the touch position based on the color of the input tool detected by the second sensor.

The controller may determine a color of an area corresponding to a predetermined ratio or more among the areas of the input tool as the color of the input tool when the color of the input tool detected by the second sensor includes a plurality of colors.

The first sensor may be configured to obtain coordinate information of a position which the touch command is input.

The first sensor may be configured to obtain trajectory information and thickness information of the input touch command.

The first sensor may be configured to obtain the trajectory information of the touch command based on coordinate change of the input touch command, and the thickness information of the touch command based on width and length information of the input touch command.

The controller may determine a start time point at which the touch command input by the input tool is touched on the display, and determine an end time point at which the touch command ended by the input tools is released from the display.

The controller may control the graphic corresponding to the input touch command from the start time point displayed in the detected touch position in the detected color when the start time point at which the touch command is input is determined.

The controller, in response to determining the start time point at which the touch command is input, may control the graphic corresponding to the touch command input from the start time point to be displayed in the detected color at the detected touch position.

The controller may detect the color of the input tool in response to a time point when the touch command is touched by the input tool.

In accordance with an aspect of the disclosure, a controlling method of an input apparatus comprises inputting a touch command from an input tool; detecting a touch position of the input touch command; detecting a color of the input tool; and controlling a graphic corresponding to the input touch command to be displayed in the detected color at the detected touch position.

Also, the detecting the color of the input tool may comprise obtaining color information by recognizing the color of the input tool.

Also, the detecting the color of the input tool may comprise determining a color of a predetermined area of the input tool as the color displayed at the touch position based on the color of the input tool detected by a second sensor.

Also, the detecting the color of the input tool may comprise determining a color of an area corresponding to a predetermined ratio or more among areas of the input tool as the color of the input tool when the color of the input tool detected by a second sensor includes a plurality of colors.

Also, the detecting the color of the input tool may comprise obtaining coordinate information of a position which the touch command is input, and obtaining trajectory information and thickness information of the input touch command.

Also, the obtaining the trajectory information and the thickness information of the input touch command may comprise, obtain the trajectory information of the touch command based on coordinate change of the input touch command, and the thickness information of the touch command based on width and length information of the input touch command.

The method may further comprise determining a start time point at which the touch command input by the input tool is touched on the display; and determining an end time point at which the touch command ended by the input tools is released from the display.

Controlling a graphic corresponding to the input touch command from the start time point may be displayed in the detected touch position in the detected color when the start time point at which the touch command is input is determined.

Controlling a graphic corresponding to the input touch command from an input start time point of the touch command to an input end time point of the touch command may be displayed in a color of the detected input tool.

Advantageous Effects

An input apparatus according to an embodiment of the present disclosure, wherein by detecting a color and a touch form of an input tool for inputting a touch command to display a graphic in the detected color and the input touch form, a user can input an intuitive touch command in various colors. In addition, since there is no limitation on the input tool used to input the touch command in various colors and touch forms, the possibility of replacing the tool is increased and there is no additional cost.

BEST MODE

Mode for Invention

Figure 1:
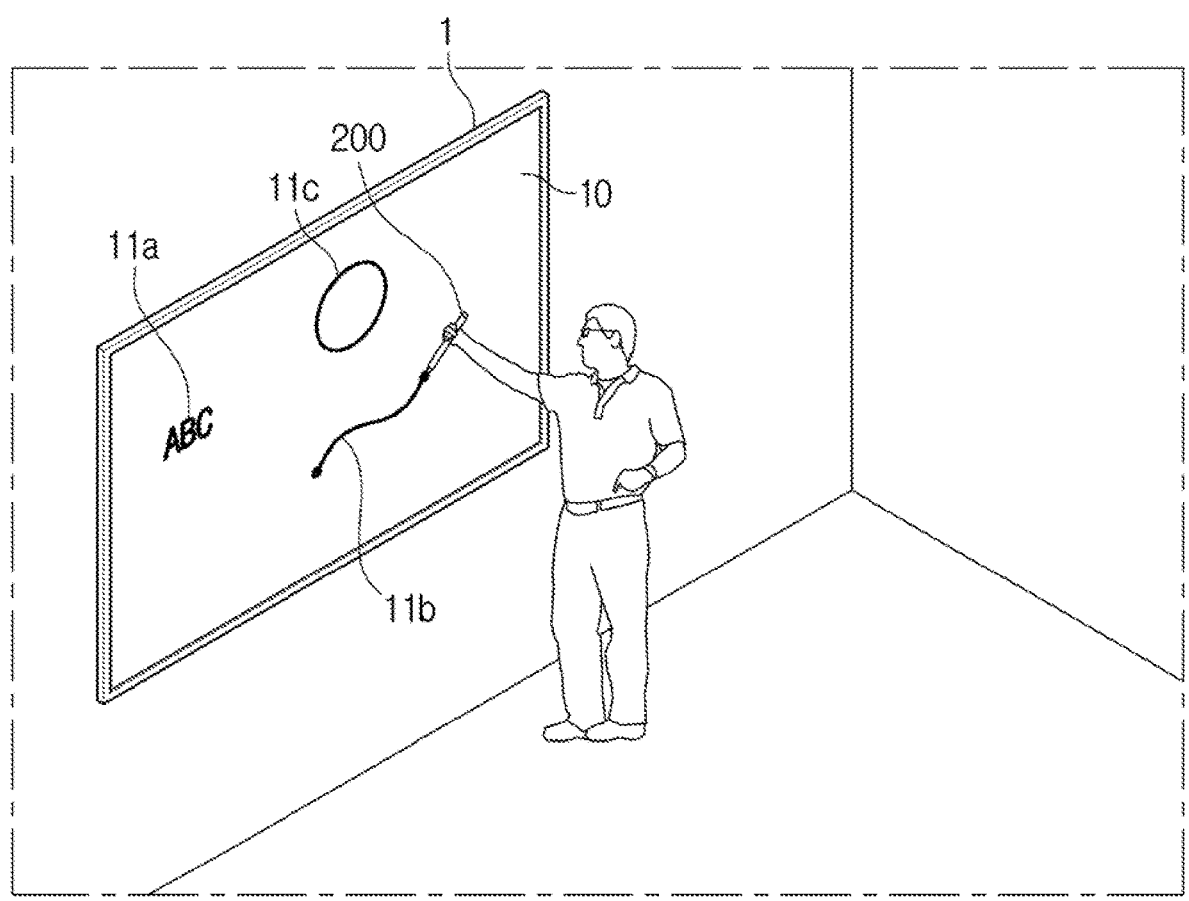
FIG. 1 illustrates a usage form of an input apparatus according to an embodiment.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of"units," "modules," "members," or "blocks" may be implemented as a single component or a single "unit," "module," "member," or "block" may include a plurality of components.

It will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described with reference to the accompanying drawings.

FIG. 1 illustrates a usage form of an input apparatus according to an embodiment.

An input apparatus 1 according to an embodiment of the present disclosure may have various embodiments such as a display apparatus including a touch panel. However, in the following description, the input apparatus 1 is an electronic blackboard.

The input apparatus 1 may be provided in various forms and is not limited to an installation position. Referring to FIG. 1, the input apparatus 1 may be installed in a form of being hung on a wall, and although not illustrated, the input apparatus 1 may be installed in a standing form by a stand supporting the input apparatus 1.

The input apparatus 1 may be implemented as a TV, a computer monitor, a video wall, or the like including at least one display 10. The input apparatus 1 may be configured to be implemented as the electronic blackboard through execution of an embedded application. For example, in the case of the input apparatus 1 implemented as the TV, the input apparatus 1 may be provided to be operated as the electronic blackboard under a preset mode or under an activation state of a preset application.

The input apparatus 1 according to the disclosed embodiment may include the one display 10, and a plurality of the displays 10 may be arranged in a matrix form according to an implementation method of the input apparatus 1 to implement a large screen.

A plurality of graphic objects may be displayed on the display 10 provided in front of the input apparatus 1. The graphic object may include not only a video, a picture, and an image, but also all content that can be visually displayed on the display 10 such as an application execution window.

A user may touch the display 10 of the input apparatus 1 to input a touch command. In detail, the user may input a touch command to be displayed on the display 10 by touching an input tool 200 such as a pen on the display 10.

When the user inputs a touch command by touching the display 10 with the input tool 200, the input apparatus 1 continuously detects an electromagnetic field generated from the tip of the input tool 200, and then touches the display 10 touched by the input tool 200. Therefore, coordinates of phases can be calculated continuously. Since the input apparatus 1 may display an image or a graphic corresponding to the calculated coordinates on the display 10, the input tool 200 may display the input contents by touching the display 10 with the input tool 200 at a corresponding position of the display 10.

As shown in FIG. 1, the user inputs a letter 11a such as A, B, and C, a line 11b, or a shape such as a circle 11c by touching the input tool 200 on the display 10. In addition, the user may input a touch command of various contents or forms by touching the input tool 200 on the display 10.

When the input tool 200 is touched on the display 10 and the touch command is input, the input apparatus 1 may execute a pen tool that draws a line or writes letters along a path where the input tool 200 is touched. In detail, the input apparatus 1 may generate a graphic corresponding to the touch command input by the user and display it on the display 10 along the path where the input tool 200 is touched on the display 10.

As such, the input apparatus 1 may function as the electronic blackboard, display various graphics on the display 10, and perform a preset function corresponding to a touch input of the input tool 200.

Figure 2:
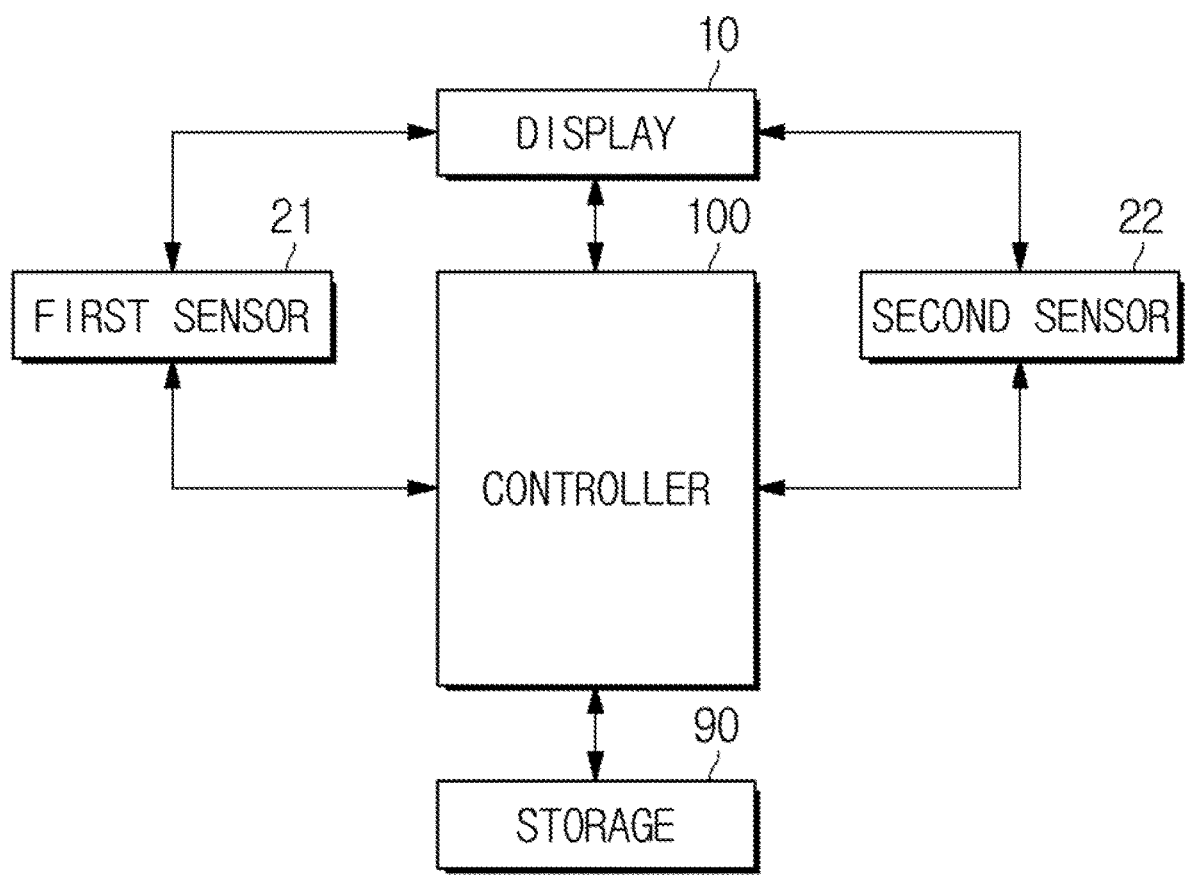
FIGS. 2 and 3 are control block diagrams of an input apparatus according to an embodiment.
Figure 3:
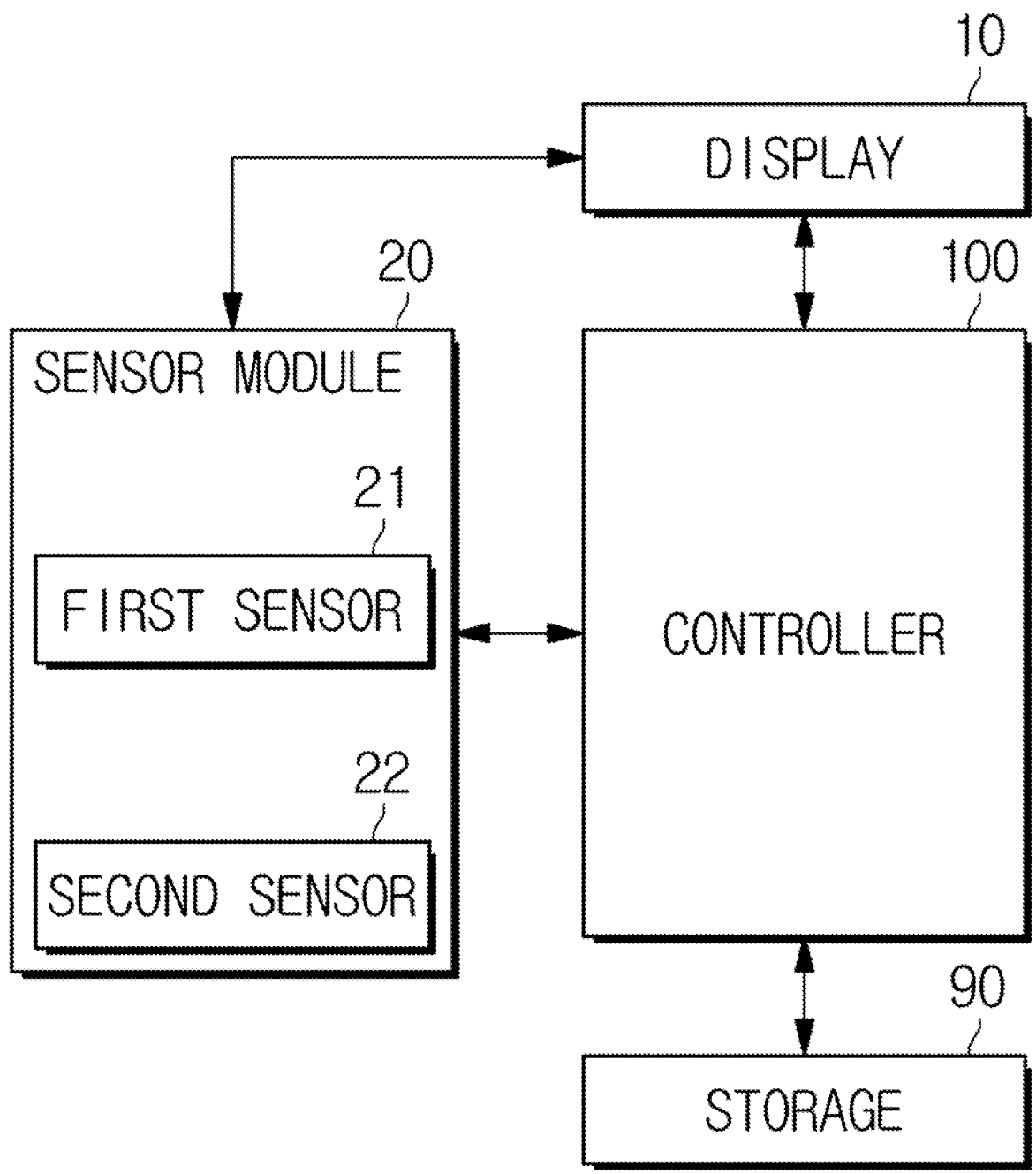
Figure 4:
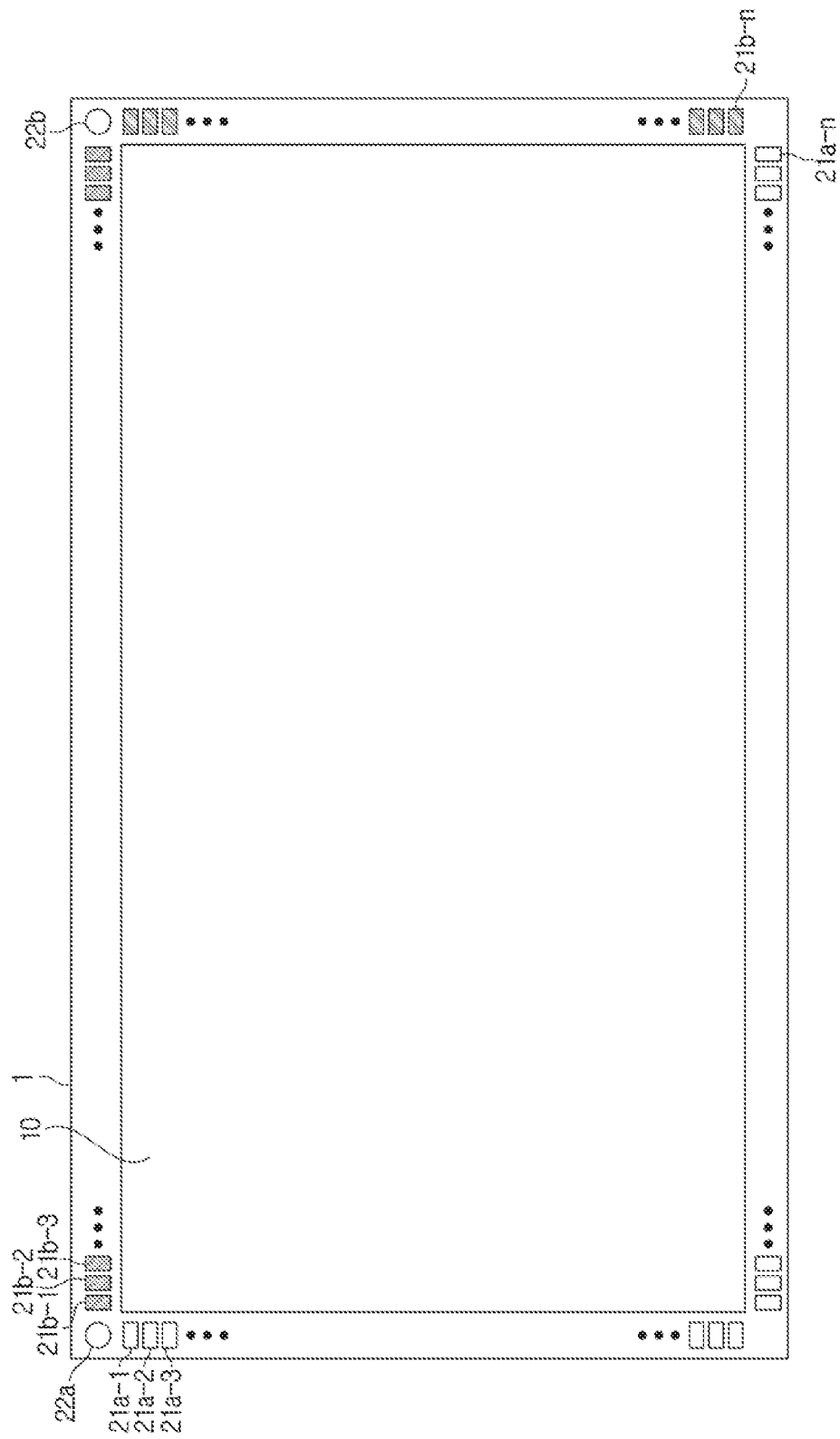
FIG. 4 is a diagram illustrating that a first sensor and a second sensor are provided in an input apparatus according to an embodiment.
Figure 5:
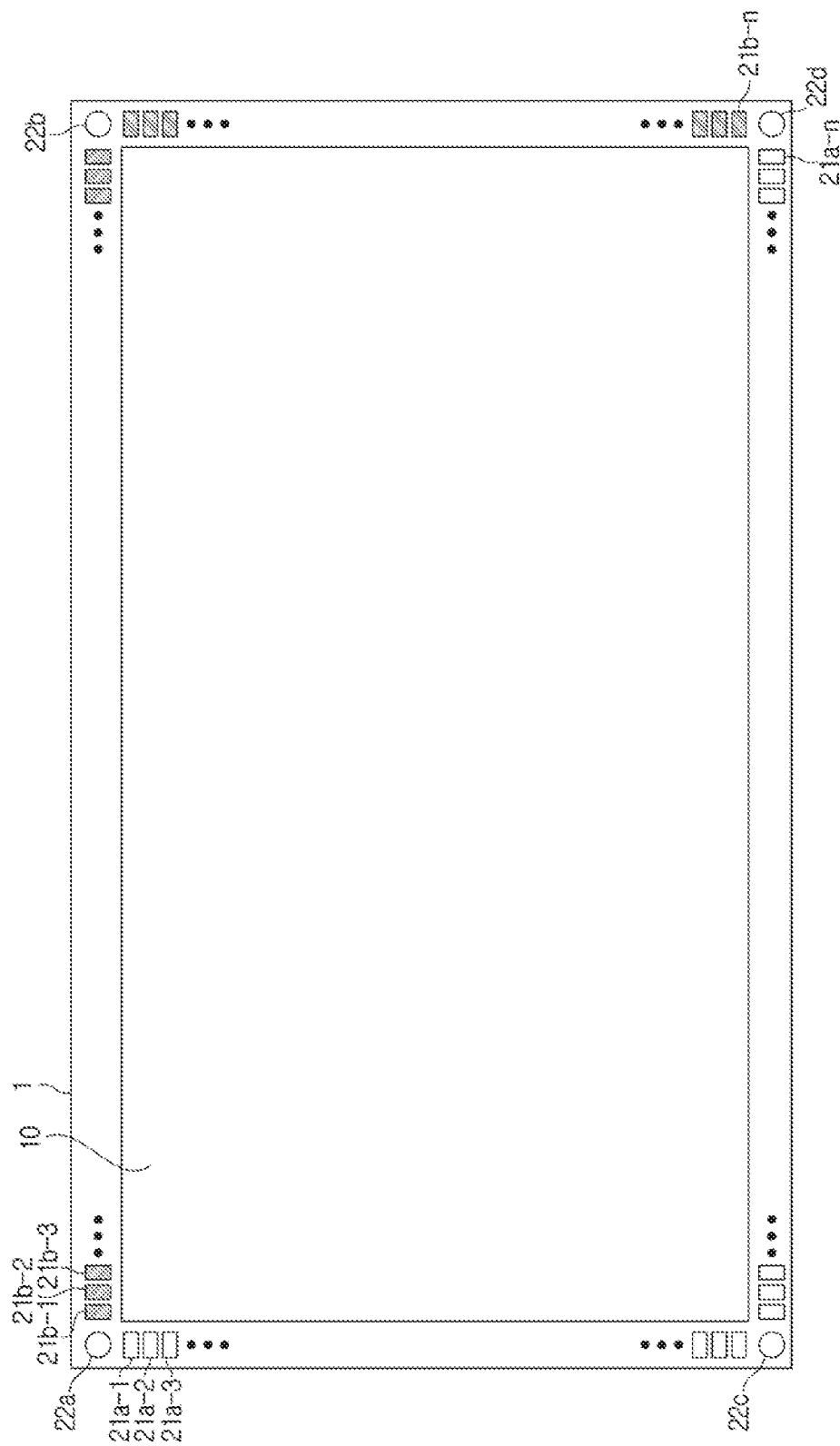
FIGS. 5 and 6 are diagrams showing that a first sensor and a second sensor are provided in an input device according to another embodiment.
Figure 6:
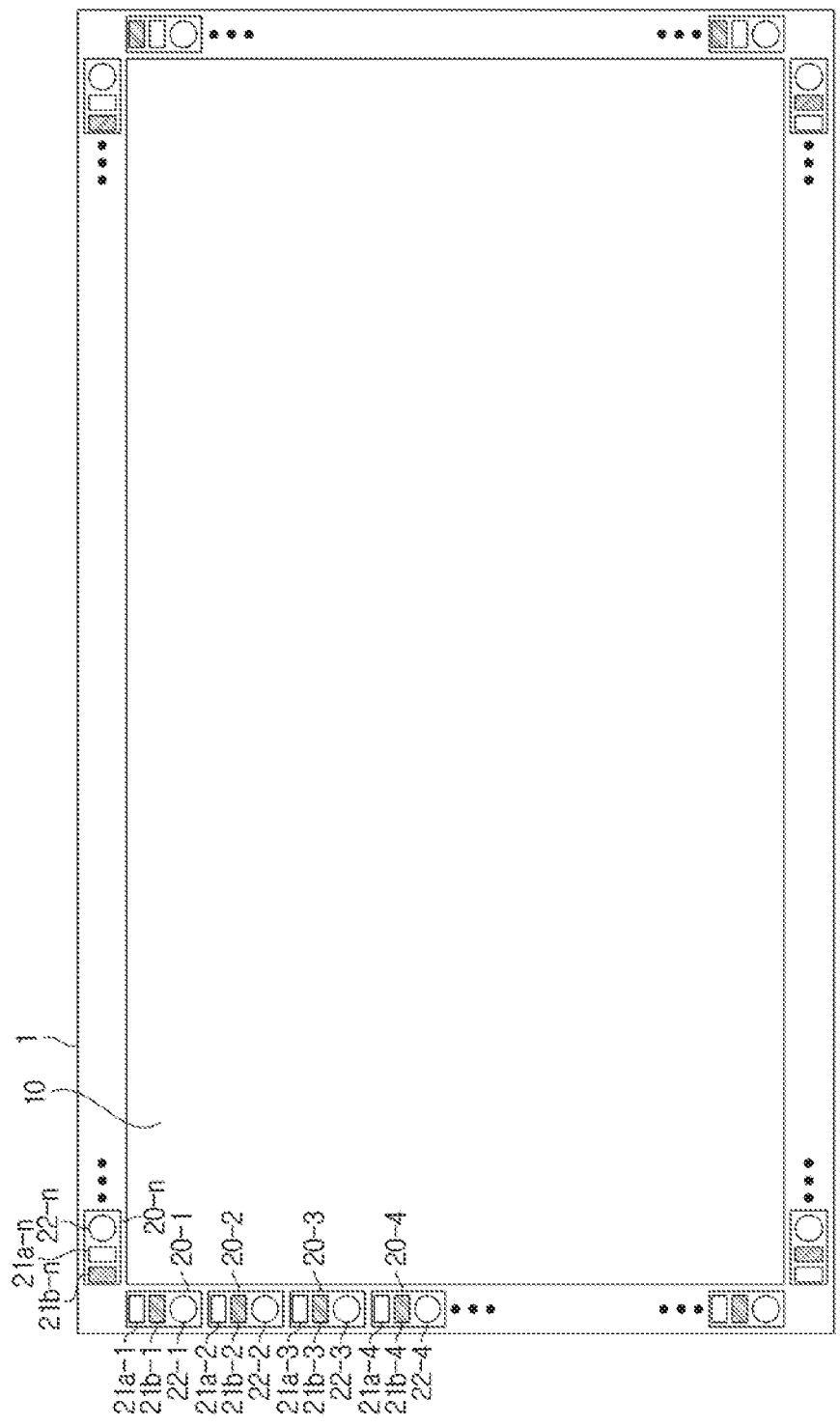

FIGS. 2 and 3 are control block diagrams of an input apparatus according to an embodiment. FIG. 4 is a diagram illustrating that a first sensor and a second sensor are provided in an input apparatus according to an embodiment. FIGS. 5 and 6 are diagrams showing that a first sensor and a second sensor are provided in an input device according to another embodiment.

Referring to FIGS. 2 and 3, the input apparatus 1 according to an embodiment may include the display 10 receiving a touch command from the user, a first sensor 21 sensing a touch position of a touch command input on the display 10, a second sensor 22 for detecting a color of the input tool 200 for inputting a command, a storage for storing data related to the control of the input apparatus 1, and a controller 100 for controlling each component of the input apparatus 1.

As described above, various graphics or objects that may be visually displayed are displayed on the display 10, and the user may input a touch command by touching the display 10.

The display 10 may be implemented as various display panels. For example, the display 10 may be implemented with various display panels such as a liquid crystal display panel (LCD panel), a plasma display panel (PDP), an organic light emitting diode (OLED), a vacuum fluorescence display (VFD), a field emission display (FED), a light-emitting diode, a surface-conduction electron-emitter, a carbon nanotube, a nano-crystal, and an ELD electro luminescence display (ELD). It can be a flexible display in which elements constituting elements are bent, or a three-dimensional display that displays a graphic object on a screen three-dimensionally using glasses or without glasses.

The first sensor 21 may be provided on the input apparatus 1 to detect a touch position of the touch command input to the display 10. That is, the first sensor 21 may detect a touch in which any object including the input tool 200 contacts the display 10. The first sensor 21 may detect the touch of all objects in contact with the display 10 or the touch of an object having some limited characteristics. The input tool 200 or any object in which the first sensor 21 detects a touch and detects a touch position may vary according to a touch method, and various embodiments may exist in a manner of sensing a touch.

That is, the touch method that may be used in the input apparatus 1 according to the embodiment of the present disclosure may be implemented in various forms. The first sensor 21 provided in the input apparatus 1 may sense a touch command by using a resistive touch method or a capacitive touch method.

The resistive touch method may acquire touch coordinates to which a touch command is input, and sense a touch with respect to all input means. The capacitive touch method can be applied when the input means has a capacitance, the surface type capacitive touch method is capable of single touch recognition, and the projected capacitive touch method is capable of multi-touch recognition.

In addition, the first sensor 21 may be implemented by a pressure touch method. The pressure touch method is different from the touch method using electrical characteristics. The four corners of the sensor sense stress generated by a force that presses a touch screen of an object mechanically to obtain coordinates of the touch point. The pressure touch method can detect a single touch, or detect all input means.

In addition, the first sensor 21 may be implemented by a wave touch method. An example of the wave touch method is a surface acoustic wave (SAW) touch method. The SAW touch method can detect a single touch and can sense touch input for all input means.

In addition, the first sensor 21 may be implemented by a bending wave touch method. The sensor provided in the bending wave touch method is implemented as a piezoelectric sensor. When a touch command is input by an object, the piezoelectric sensor may detect a vibration generated by the touch to recognize the touch. The touch position where the touch command is input may be determined by comparing magnitudes of vibrations sensed by a plurality of the piezoelectric sensors. Such bending wave touch method can detect a single touch and can sense a touch input for all input means.

In addition, the first sensor 21 may be implemented by an optical imaging touch method. The sensor provided in the optical imaging touch method may be implemented as an optical sensor, and the optical sensor may be implemented as an infrared camera. The touch position to which the touch command is input may be obtained by triangulation based on different images captured by a plurality of the optical sensors spaced by a predetermined distance. Such optical imaging touch method may be multi-touch, and all objects may be used as touch input means.

In addition, the first sensor 21 may be implemented by an optical waveguide touch method. The sensor provided in the optical waveguide touch method may be implemented as an image sensor, and the image sensor detects whether infrared light is received by a plurality of waveguides included in a plurality of waveguide arrays. In detail, the image sensor may acquire touch coordinates of the input touch command by detecting that infrared rays are blocked. In the optical waveguide touch method, multi-touch is possible, and all objects may be used as touch input means.

In addition, the first sensor 21 may be implemented by an infrared matrix touch method. Referring to FIG. 4, an infrared matrix touch panel includes infrared LED arrays 21a: 21a-1, 21a-2, . . . , 21a-n and optical receivers 21b: 21b-1, 21b-2, . . . , 21b-n.

That is, the first sensor 21 may be implemented with the infrared LED array 21a and the optical receiver 21b, or the first sensor 21 may include the infrared LED array 21a and the optical receiver 21b.

The infrared matrix touch method is capable of single touch and multi-touch, and all objects can be used as touch input means.

The touch method used in the input apparatus 1 according to the disclosed embodiment may be implemented in various forms as described above. In addition, there is no limitation to the touch method that may be implemented in the input apparatus 1. The touch method used in the input apparatus 1 described below will be described using the infrared matrix touch method as an example. That is, the case where the first sensor 21 is implemented with the infrared LED array 21a and the optical receiver 21b will be described as an example.

As shown in FIG. 4, the infrared LED arrays 21a: 21a-1, 21a-2, . . . , 21a-n and the optical receivers 21b: 21b-1, 21b-2, . . . , 21b-n included in the first sensor 21 may be arranged in an array at corners of the display 10 to face each other. In FIG. 4, the first sensor 21 is provided on the outside of the display 10 for convenience of description, but the first sensor 21 may be provided on the inside of the display 10 and may be provided at each position of the display 10.

In addition, as will be described later, the position of the first sensor 21 provided on the display 10 is not limited, and may be disposed anywhere where it is disposed to sense a touch input.

Light emitting elements of the infrared LED arrays 21a: 21a-1, 21a-2, . . . , 21a-n irradiate infrared rays, and the irradiated infrared rays may be received by light receiving sensors of the corresponding optical receivers 21b: 21b-1, 21b-2, . . . , 21b-n. When the input tool 200 is touched on the display 10, the input tool 200 blocks at least two infrared rays traveling in horizontal and vertical directions. That is, the first sensor 21 may obtain touch coordinate information of a touch command input to the display 10 from a position of the light receiving sensor that does not receive infrared rays from a position among the light receiving sensor that does not receive infrared rays among the horizontal x-axis optical receivers 21b: 21b-1, 21b-2, . . . , 21b-n and the light receiving sensor that does not receive infrared rays among the vertical y-axis optical receivers 21b: 21b-1, 21b-2, . . . , 21b-n.

Figure 7:
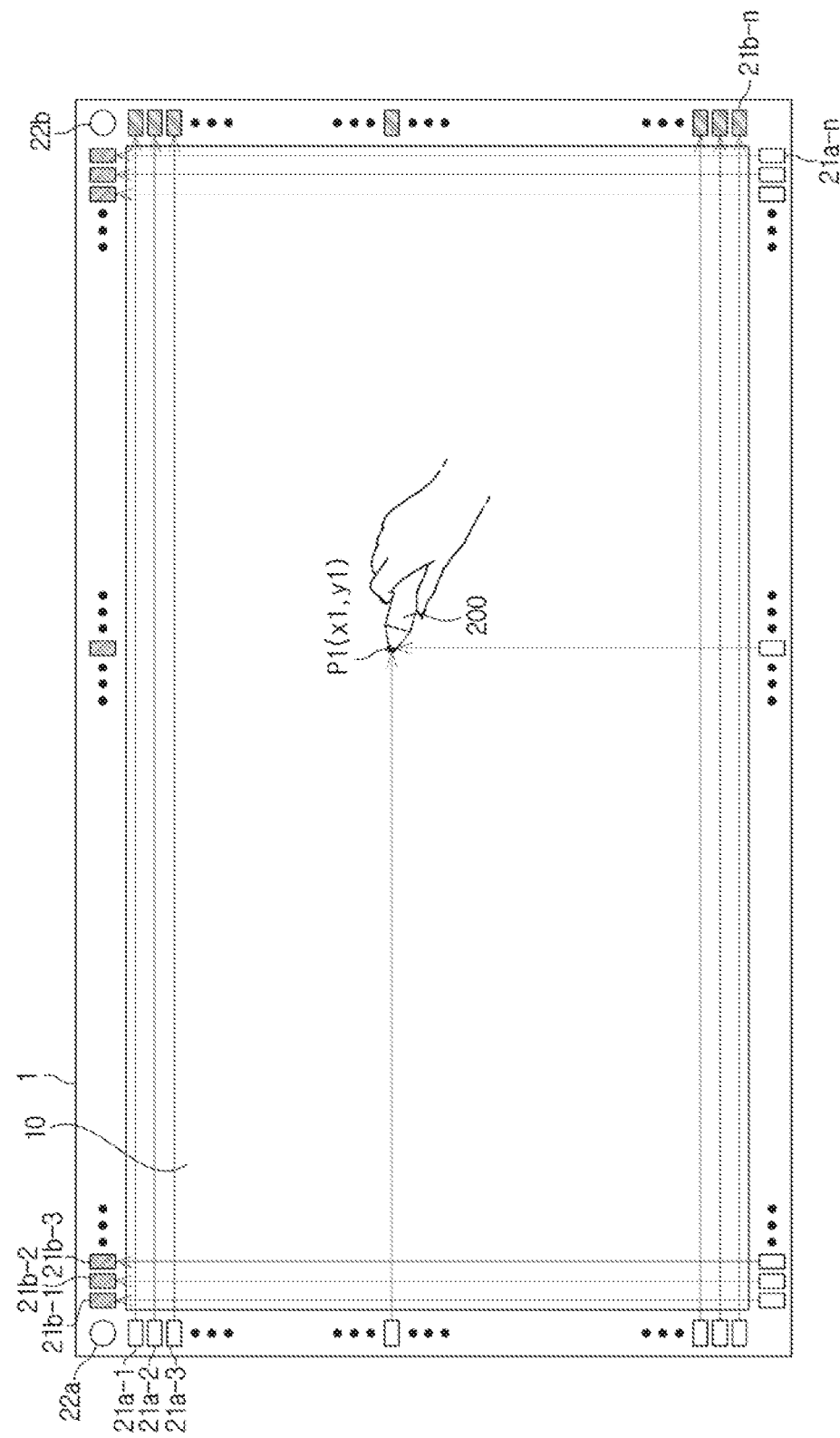
FIGS. 7 and 8 illustrate an embodiment in which a first sensor senses a touch position of a touch command input to a display.
Figure 8:
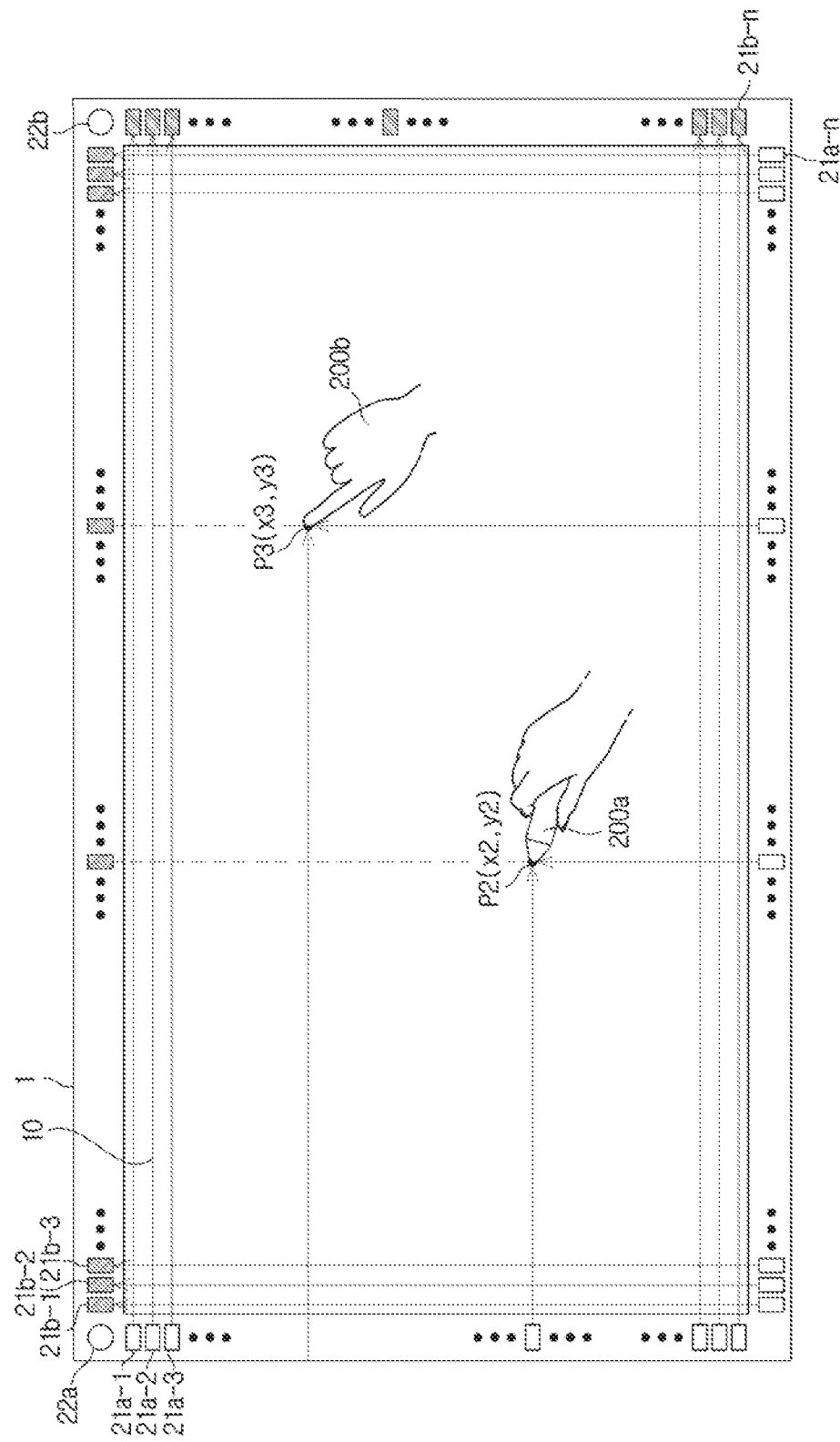

FIGS. 7 and 8 illustrate an embodiment in which a first sensor senses a touch position of a touch command input to a display.

As illustrated in FIG. 7, the user may input a touch command by touching the input tool 200 on the display 10.

The first sensor 21 may detect the touch position of the touch command input to the display 10 from the input tool 200. Referring to FIG. 7, when the input tool 200 is touched on the display 10, the infrared rays irradiated from the infrared LED array 21a provided at a left y-axis corner of the display 10 and proceeding in a horizontal direction do not reach the optical receiver 21b provided at a right y-axis corner of the display 10 and are blocked. In addition, the infrared LED array 21a provided at a bottom x-axis corner of the display 10 is irradiated and travels in the vertical direction without reaching the optical receiver 21b provided at a top x-axis corner of the display 10.

That is, the first sensor 21 may obtain touch coordinates P1 (x1, y1) of the touch command input to the terminal from the positions of the light receiving sensor that does not receive infrared rays among the upper x-axis optical receiver 21b of the display 10 and the light receiving sensor that does not receive infrared rays among the right y-axis optical receiver 21b.

As shown in FIG. 8, when a touch command is input to the display 10 through a plurality of input tools 200a and 200b, the first sensor 21 may detect a touch position of a touch command input from each of the plurality of input tools 200a and 200b.

When the input tools 200a and 200b are touched on the display 10, the input tools 200a and 200b block at least two infrared rays traveling in the horizontal and vertical directions. The first sensor 21 may acquire touch coordinates P2 (x2, y2) of the touch command input to the display 10 through the input tool 200a from the positions of the light receiving sensor that does not receive infrared rays in the upper x-axis optical receiver 21b of the display 10 and the light receiving sensor that does not receive infrared rays in the right y-axis optical receiver 21b. Similarly, the first sensor 21 may acquire touch coordinates P3 (x3, y3) of the touch command input to the display 10 through the input tool 200b.

The first sensor 21 may simultaneously or sequentially sense the touch positions of the touch commands input from the plurality of input tools 200a and 200b.

In addition, the first sensor 21 may acquire trajectory information and thickness information of the touch command input to the display 10.

Figure 9:
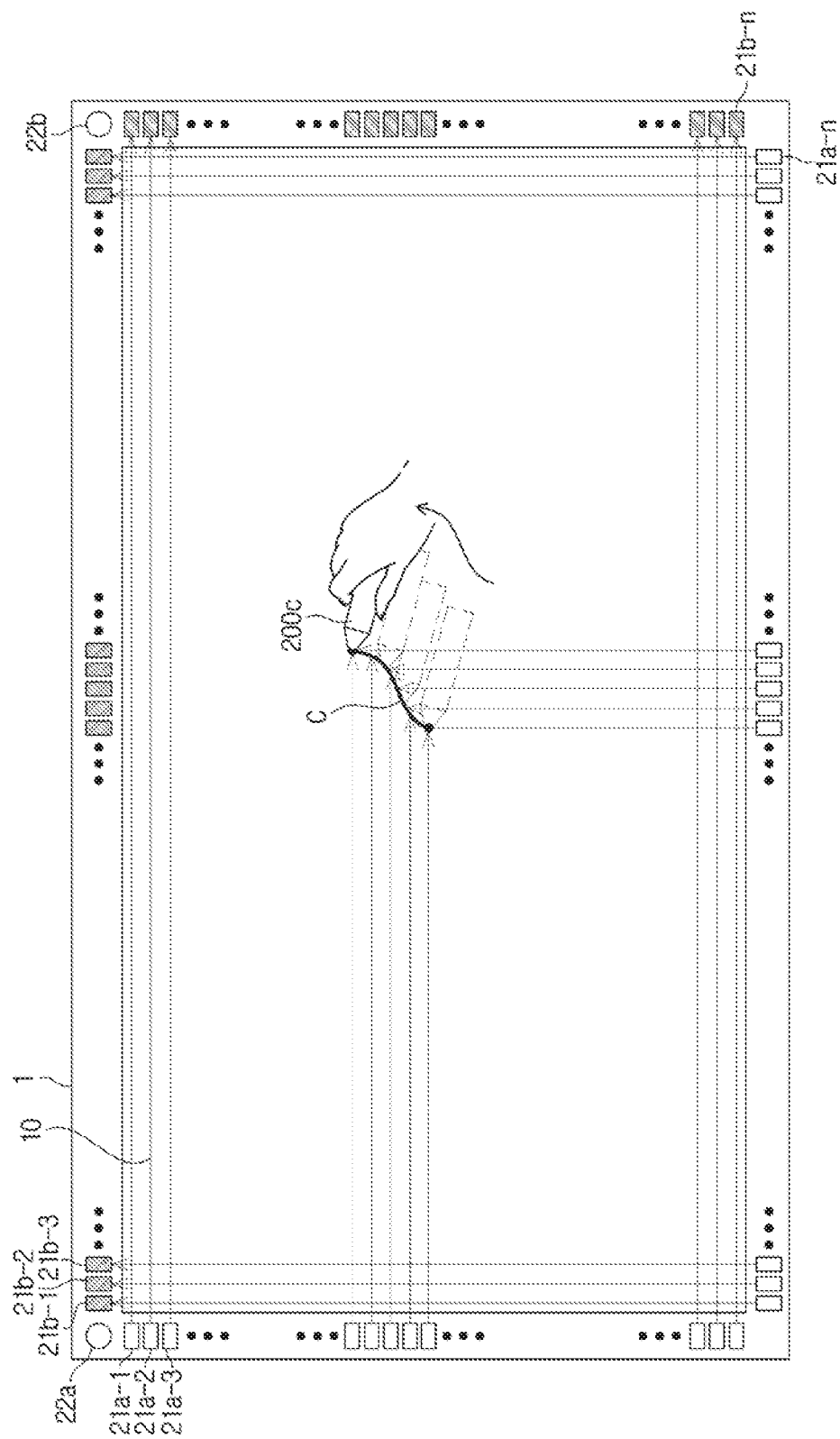
FIG. 9 is a diagram illustrating a first sensor detecting a trajectory of a touch command input to a display according to an embodiment.
Figure 10:
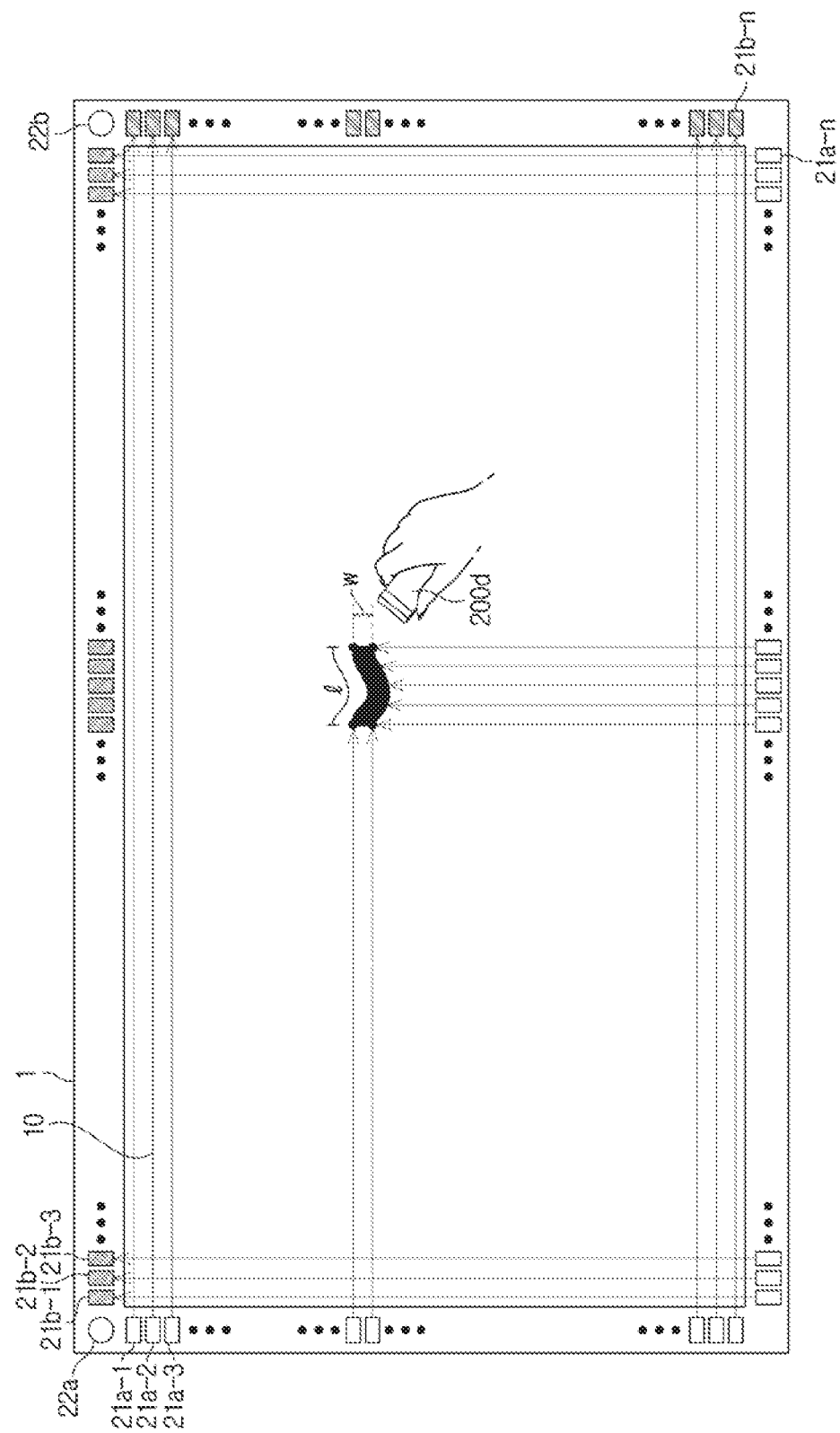
FIG. 10 is a diagram illustrating a first sensor detecting a thickness of a touch command input to a display unit according to an embodiment.

FIG. 9 is a diagram illustrating a first sensor detecting a trajectory of a touch command input to a display according to an embodiment. FIG. 10 is a diagram illustrating a first sensor detecting a thickness of a touch command input to a display unit according to an embodiment.

Referring to FIG. 9, the user may input a touch command having a certain shape such as drawing or writing letters on the display 10 by moving an input tool 200c while touching the input tool 200c on the display 10.

The first sensor 21 may detect a touch position changed according to the movement of the input tool 200c touched on the display 10.

As shown in FIG. 9, the touch position detected by the first sensor 21 may change according to the movement of the input tool 200c. That is, as the touch coordinates acquired by the first sensor 21 change as the input tool 200c moves, the first sensor 21 may continuously obtain the changed touch coordinates. The first sensor 21 may acquire the coordinate information of a position at which the touch command is input, and acquire a trace of the touch command based on the obtained set of coordinate information.

Referring to FIG. 9, when the user draws a curve trajectory on the display 10 through the input tool 200c, the first sensor 21 may move from the point where the touch input starts to the point where the touch input ends in FIGS. 7 to 8. In the same manner as described above, the change in the coordinates of the touch command may be detected. As a result, the first sensor 21 may acquire the trajectory of the curve input by the user by touching the display 10.

Referring to FIG. 10, when the user moves an input tool 200d while touching the display 10 with the input tool 200d having a predetermined thickness, the user can input a touch command with a certain width or thickness, such as drawing or writing letter on the display 10.

The first sensor 21 may detect a touch position changed according to the movement of the input tool 200d touched on the display 10, and as shown in FIG. 10, the touch position detected by the first sensor 21 may change according to the movement of the input tool 200d.

When the input tool 200d that is touched on the display 10 has a predetermined thickness or width, the first sensor 21 obtains the coordinate information of a 'line,' which is a set of touch coordinates, based on the coordinate information of the position at which the touch command is input. In addition, the first sensor 21 may obtain the coordinate information of a 'plane' based on the obtained coordinate information of the line.

As shown in FIG. 10, when the user draws on a touch surface while touching the display 10 with the input tool 200d having a predetermined thickness or width, the first sensor 21 may obtain the thickness information of the touch command based on a change in the coordinates of the position where the touch command is input.

That is, the first sensor 21 may obtain the thickness information of the touch command based on width w and length l information of the touch command input to the display 10.

The first sensor 21 may transmit the information obtained by detecting a touch position of a touch command input to the display 10 from the input tool 200 to the controller 100. The first sensor 21 may be installed on the display 10, and the installation position and the number of installations are not limited.

The second sensor 22 may detect a color of the input tool 200 provided on the input apparatus 1 and input a touch command to the display 10. That is, when the user inputs a touch command by touching the display 10 with the input tool 200, the second sensor 22 may acquire color information by recognizing the color of the input tool 200.

The second sensor 22 may be implemented as a color sensor that acquires the color information by recognizing the color of the object. The color sensor represents a sensor for the purpose of detecting color, which is one of signal information, and may be composed of a color filter and a photodiode.

The color sensor senses the amount of light and the color of the surroundings, which consist of three primary colors of light, red (hereinafter referred to as 'R'), green (hereinafter referred to as'G'), and blue (hereinafter referred to as'B'), by using the difference in wavelength, and the amount can be output to the controller 100 as an analog or digital value. The color sensor may illuminate an object with a light source and detect the reflected light with the sensor. The color sensor can recognize colors by comparing the output of the three RGB colors from the sensor. The color sensor may be automatically driven when the input apparatus 1 is driven, or selectively driven according to the user's selection.

In addition, the color sensor includes a method of dividing light passing through a slit into a spectrum by diffraction grating, and detecting it as an electrical signal by a CCD solid state camera.

This color sensor is used to detect the wavelength of light emitted or reflected by an object, such as by using color-detecting detectors, CCD cameras or other light-receiving elements, and the color can be determined by processing the output by converting the wavelength into a voltage.

Referring to FIGS. 4 and 5, the second sensor 22 implemented as the color sensor may be provided at a predetermined position of the display 10. As shown in FIG. 4, second sensors 22a and 22b may be provided at both ends of an upper edge of the display 10 to detect the color of the input tool 200. In addition, as illustrated in FIG. 5, the second sensors 22a and 22b, and second sensors 22c and 22d may be provided at both ends of the upper edge and a lower edge of the display 10.

The second sensor 22 may be provided on the display 10 according to a predetermined angle, and may be installed at any position of the display 10 as long as it can detect the color of the input tool 200. In addition, the number and shape of the second sensor 22 is not limited.

The second sensor 22 may detect the color of the input tool 200 when the input tool 200 is positioned at a predetermined distance from the display 10. That is, when the user approaches the input tool 200 to the display 10 to input a touch command on the display 10, the second sensor 22 may detect the color of the input tool 200.

In addition, the second sensor 22 may detect the color of the input tool 200 in response to a time when the touch command is initiated by the input tool 200 being touched by the display 10.

Figure 11:
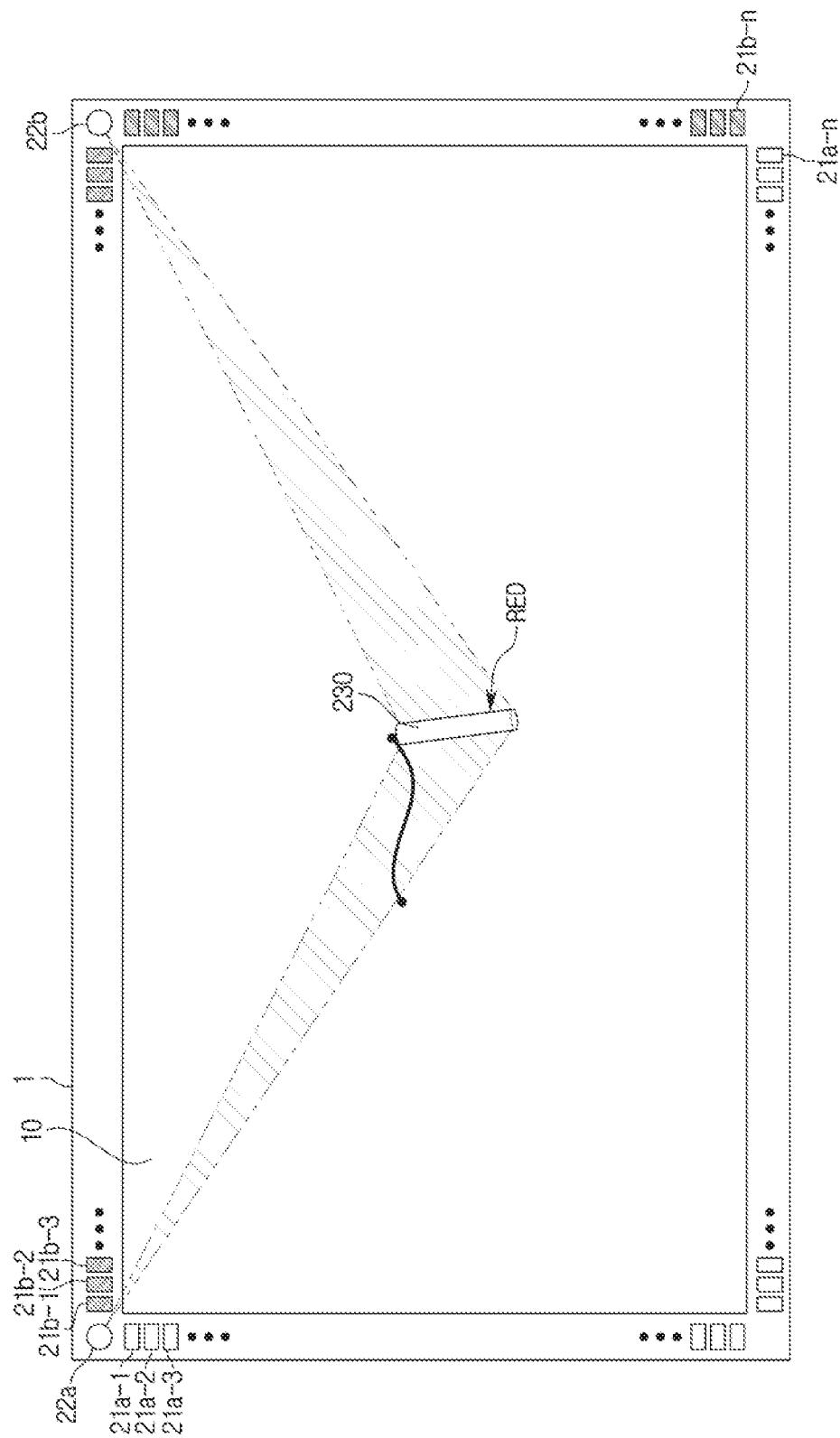
FIGS. 11 and 12 are conceptual views illustrating that a second sensor detects a color of an input tool according to an embodiment.
Figure 12:
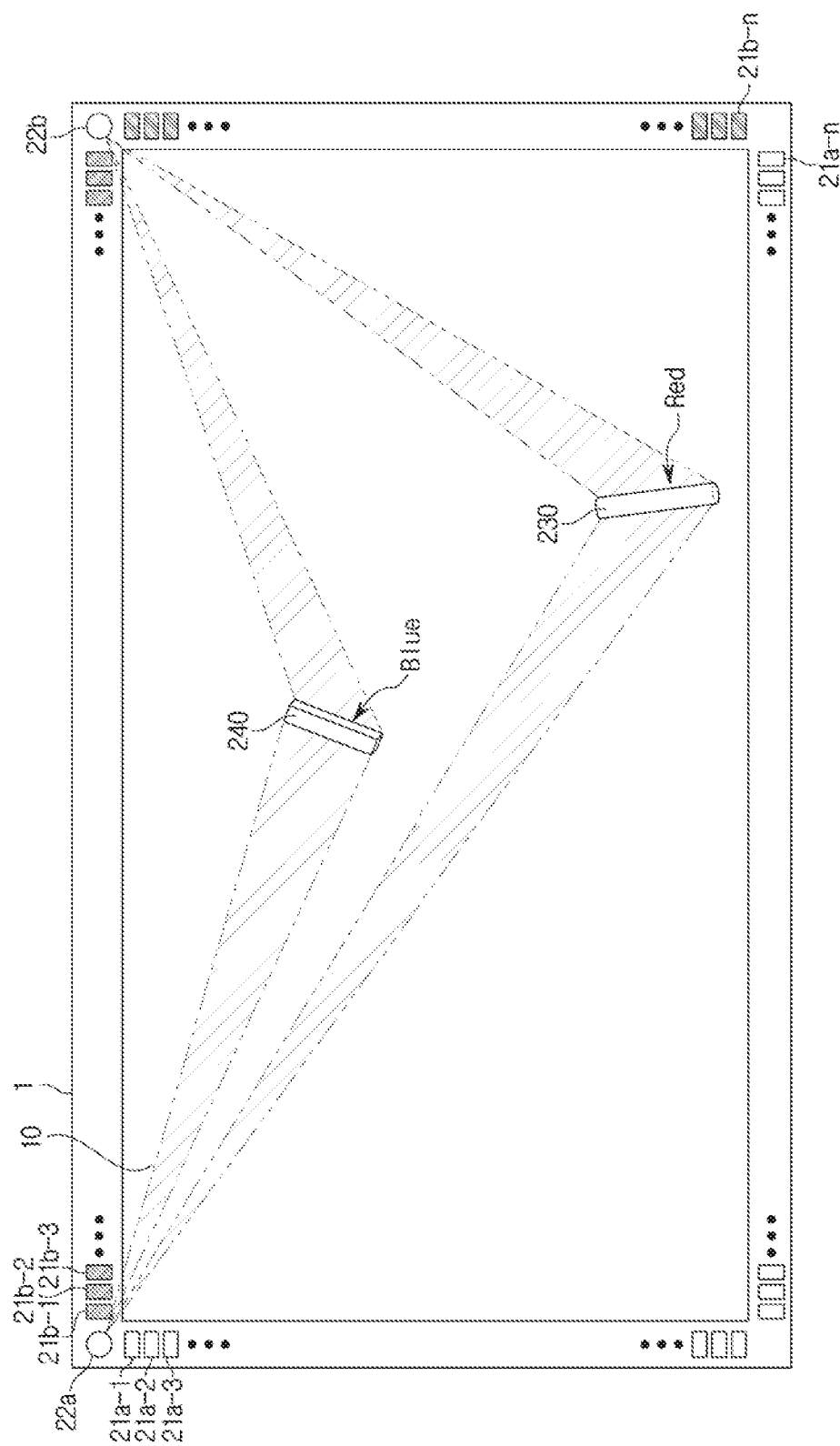

FIGS. 11 and 12 are conceptual views illustrating that a second sensor detects a color of an input tool according to an embodiment. FIGS. 13 to 17 are conceptual views illustrating determining a color of an input tool to be displayed on a display based on the color of the input tool detected by a second sensor.

As described above, the second sensor 22 may be provided at any position of the display 10 and is not limited in number. However, in the following description, the case where two of the second sensors 22a and 22b are provided at both ends of the upper edge of the display 10 will be described as an example.

Referring to FIGS. 11 and 12, the second sensor 22 may detect the color of the input tool 200. The detailed method of detecting the color has been described above, and thus redundant description will be omitted.

The second sensor 22 may acquire the color information by recognizing the color of the input tool 200 approaching or touching the display 10. The acquired color information can be transferred to the controller 100. When there are a plurality of the input tools 200, the second sensor 22 may detect colors of each of the input tools 200.

As illustrated in FIGS. 11 and 12, the second sensor 22 may acquire colors of red and blue colors by recognizing colors of a red input tool 230 and a blue input tool 240, respectively.

When the controller 100 receives the color information of the red input tool 230 or the blue input tool 240 detected from the second sensor 22, the controller 100 recognizes that the user enters a touch command through the red input tool 230 or the blue input tool 240, and controls the graphic corresponding to the detected color to be displayed on the display 10.

There is no restriction on the shape and color of the input tool 200 that the second sensor 22 can detect, and there is no limitation on the input tool 200 having a single color or the input tool 200 having a plurality of colors. In addition, when the input tool 200 is a body part such as the user's hand, the second sensor 22 may acquire the color information of the hand by detecting the color of the hand.

In addition, the second sensor 22 may transfer the color information obtained by recognizing the color of an input tool 250 to the controller 100. The controller 100 may determine the color of the predetermined area of the input tool 250 as the color of the touch input which is input to the display 10 based on the detection result of the second sensor 22.

Figure 13:
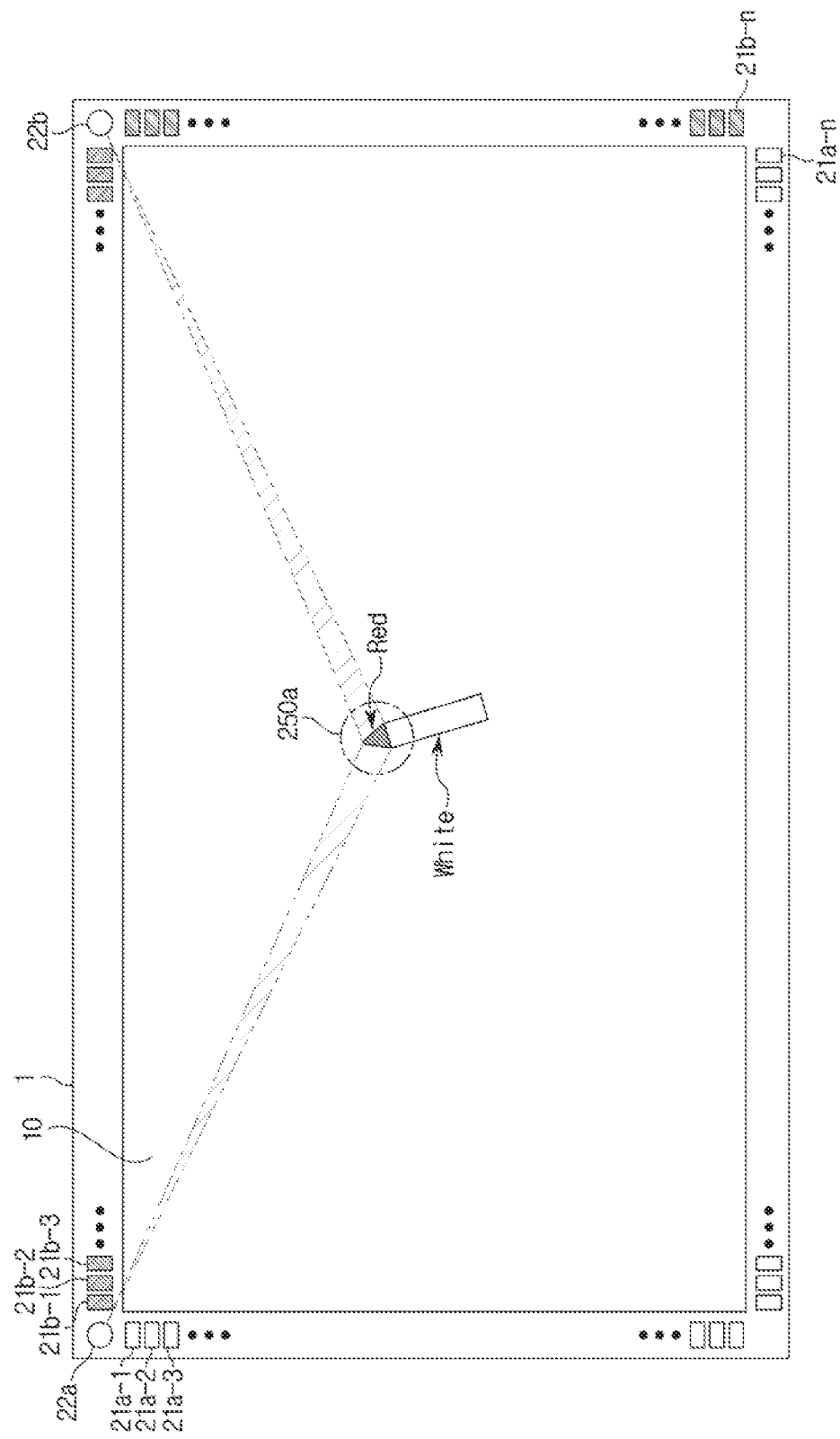
FIGS. 13 to 17 are conceptual views illustrating determining a color of an input tool to be displayed on a display based on the color of the input tool detected by a second sensor.

Referring to FIG. 13, when the input tool 250 is a pen and a nib 250a portion includes red and the remaining portion includes white, the second sensor 22 may acquire a plurality of the color information by recognizing a plurality of colors included in the input tool 250. The controller 100 must determine a color for displaying a touch command on the display 10 among a plurality of colors detected by the second sensor 22.

The controller 100 is based on data stored in a storage 90, a color included in a predetermined area may be selected from a plurality of colors included in the input tool 250 to be displayed on the display 10.

In the case of FIG. 13, the controller 100 may determine that the predetermined area of the input tool 250 corresponds to the nib 250a portion. The controller 100 may determine red, which is a color corresponding to the nib 250a portion, among red and white detected by the second sensor 22 as the display color of the touch command.

On the other hand, if the predetermined area of the input tool 250 corresponds to the remaining portion except for the nib 250a portion, the controller 100 may determine white, which is a color corresponding to the remaining portions except for the nib 250a portion, as the display color of the touch command.

As shown in FIG. 13, when the input tool 250 is a pen, it is a general intention of the user to display on the display 10 with a color corresponding to the nib 250a portion. Data in which a predetermined area of the input tool 250 is set as the nib 250a portion may be stored in the storage 90.

The data for a predetermined area of the input tool 250 may be changed and stored according to a setting, and an area to be set may also be changed.

Figure 14:
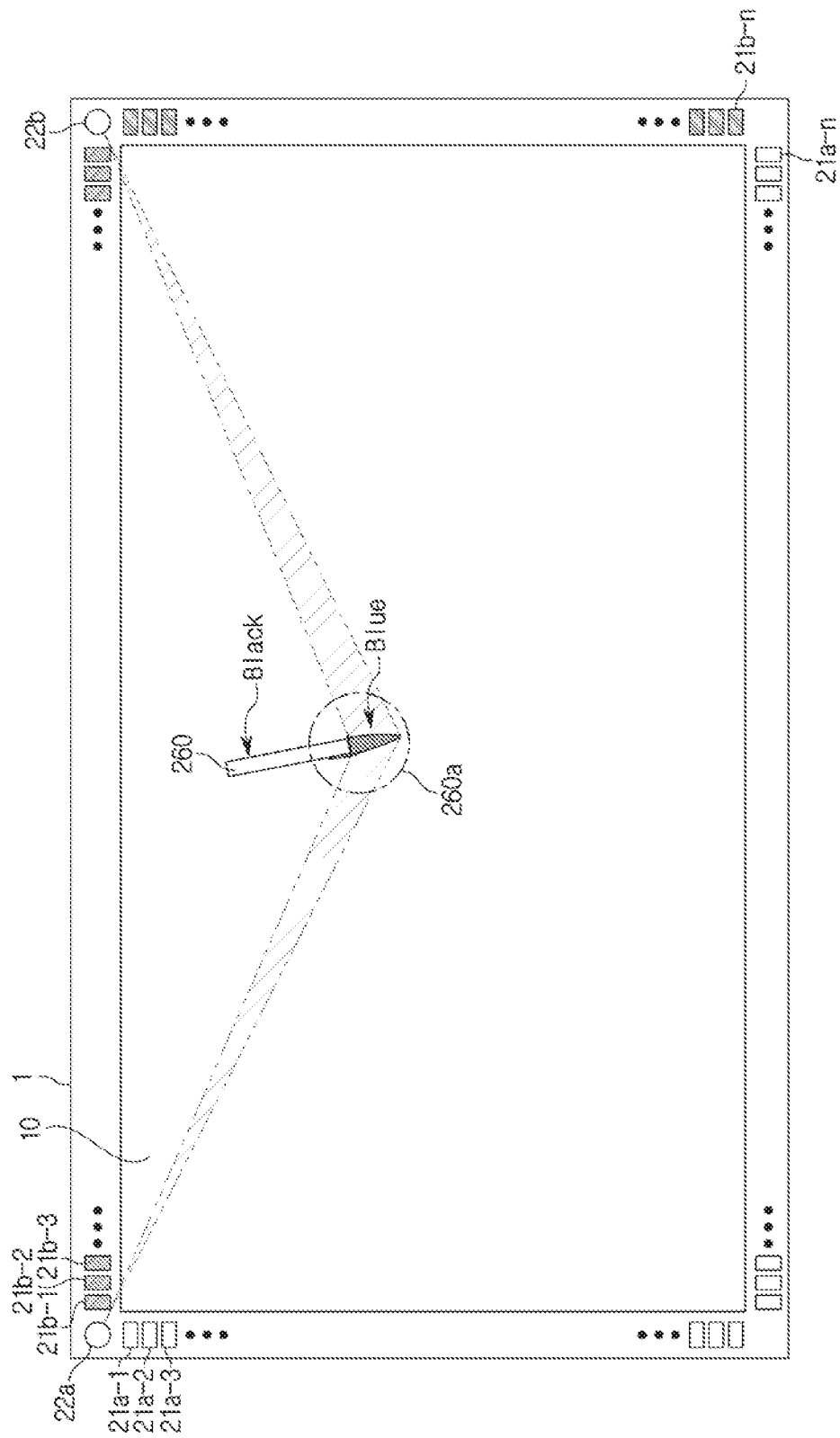

Referring to FIG. 14, when an input tool 260 is a pen and includes a lid 260a portion, the second sensor 22 may acquire the color information by recognizing a plurality of colors included in the input tool 260.

As shown, when the lid 260a portion of the pen includes blue and the remaining portion includes black, the second sensor 22 may recognize both blue and black to obtain a plurality of the color information. The controller 100 must determine a color for displaying a touch command on the display 10 among blue and black detected by the second sensor 22.

The controller 100 may control the display 10 to select a color included in a predetermined area among blue and black included in the input tool 260 based on the data stored in the storage 90 in advance.

In the case of FIG. 14, when the data stored in storage 90 for the predetermined area of the input tool 260 corresponds to the pen lid 260a portion, the controller 100 may determine blue, which is a color corresponding to a portion of the pen lid 260a, from among blue and black detected by the second sensor 22 as the display color of the touch command.

On the other hand, when the predetermined area of the input tool 260 corresponds to the remaining portion except for the pen lid 260a portion, the controller 100 may determine black, which is a color corresponding to the rest of the pen cap 260a, as the display color of the touch command.

As shown in FIG. 14, when the input tool 260 is a pen and includes the pen lid 260a portion, the color corresponding to the pen lid 260a portion is a representative color representing the color of the pen. Since the user usually displays on the display 10 in the color corresponding to the pen cap 260a, the data stored in the storage 90 may be data in which a predetermined area of the input tool 260 is set as the pen cap 260a.

Data for a predetermined area of the input tool 260 may be changed and stored according to a setting, and an area to be set may also be changed.

Figure 15:
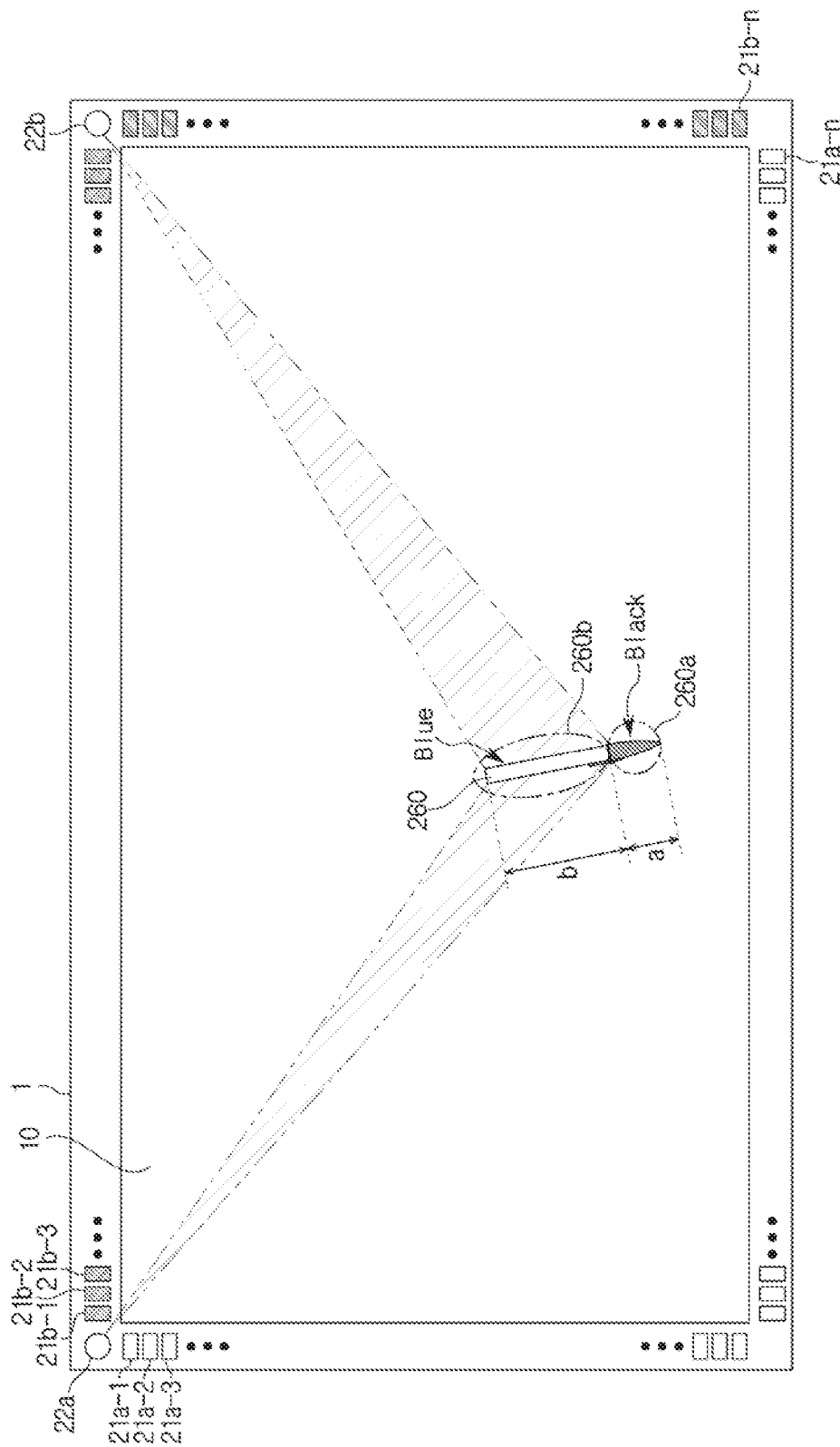

Referring to FIG. 15, when the input tool 260 includes a plurality of colors, the second sensor 22 may detect a color of the input tool 260, acquire all of the plurality of color information, and transfer the same to the controller 100.

As shown, when the pen lid 260a portion of the pen is black and a body portion 260b of the pen is blue, the second sensor 22 may acquire the color information of both by recognizing both blue and black. The controller 100 must determine a color for displaying a touch command on the display 10 among blue and black detected by the second sensor 22.

The controller 100 may determine, as the color of the input tool 260, a color for an area corresponding to a predetermined ratio or more among the areas of the input tool 260 based on the data stored in advance in the storage 90.

As shown in FIG. 15, when the area ratio of the pen lid 260a portion and the body portion 260b of the input tool 260 is a:b, in the color included in the input tool 260, a ratio of an area corresponding to black and an area corresponding to blue corresponds to a:b.

The controller 100 may determine a color corresponding to a portion of the body portion 260b corresponding to b of the ratio of the area of the input tool 260 as the display color of the touch command. That is, the controller 100 determines a predetermined ratio of the area of the input tool 260 to determine the display color of the touch command. For example, the controller 100 may determine a color occupying 80% or more of the area of the input tool 260 as the display color of the touch command.

Referring to FIG. 15, when the area corresponding to the body portion 260b of the input tool 260 corresponds to 80% or more of the total area, and the color corresponding to the area is blue, the controller 100 may determine blue as the display color of the touch command.

As such, data about a predetermined ratio, which is a reference for determining the display color of the touch command, in the area of the input tool 260 may be preset and stored in the storage.

Figure 16:
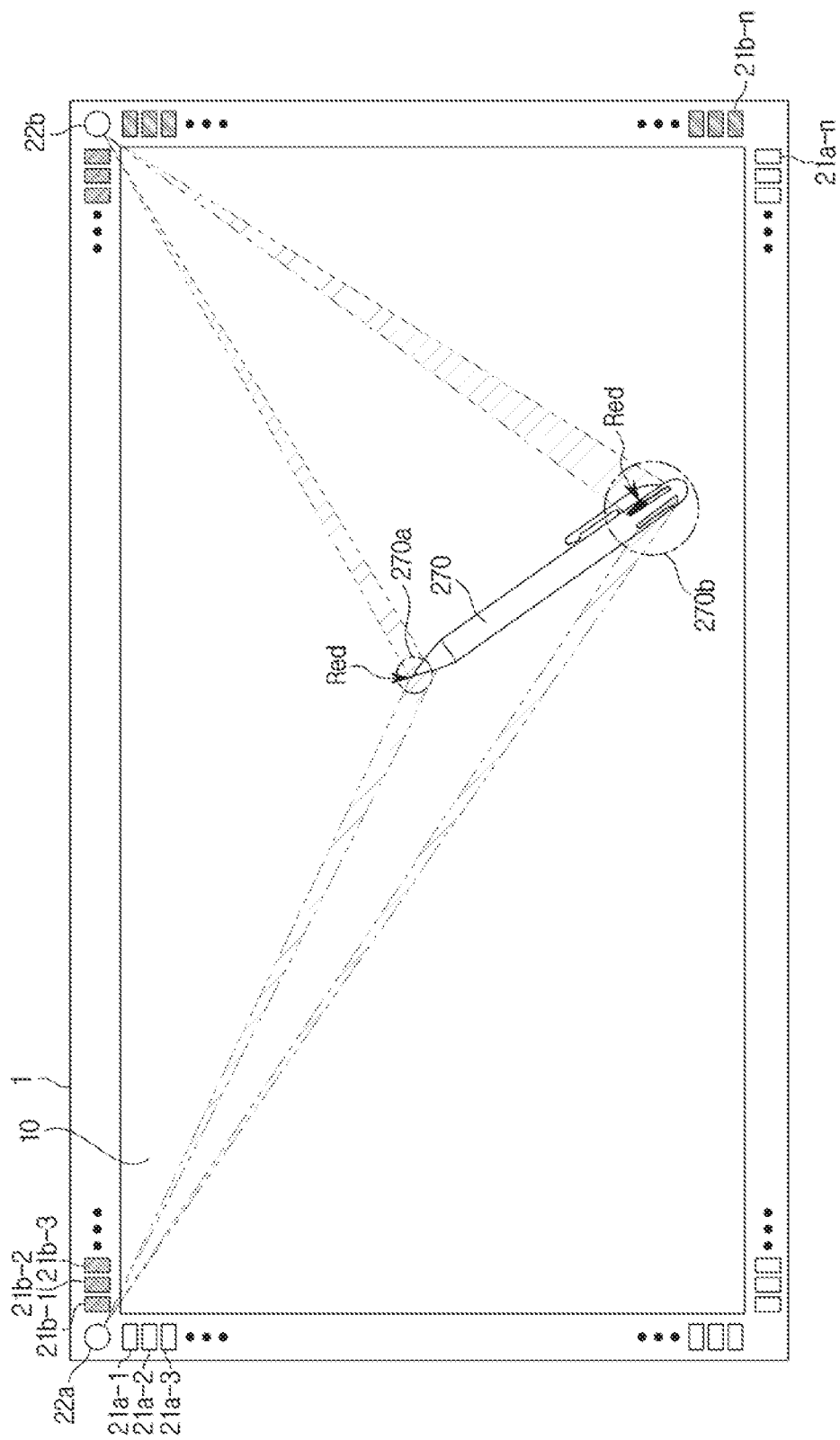
Figure 17:
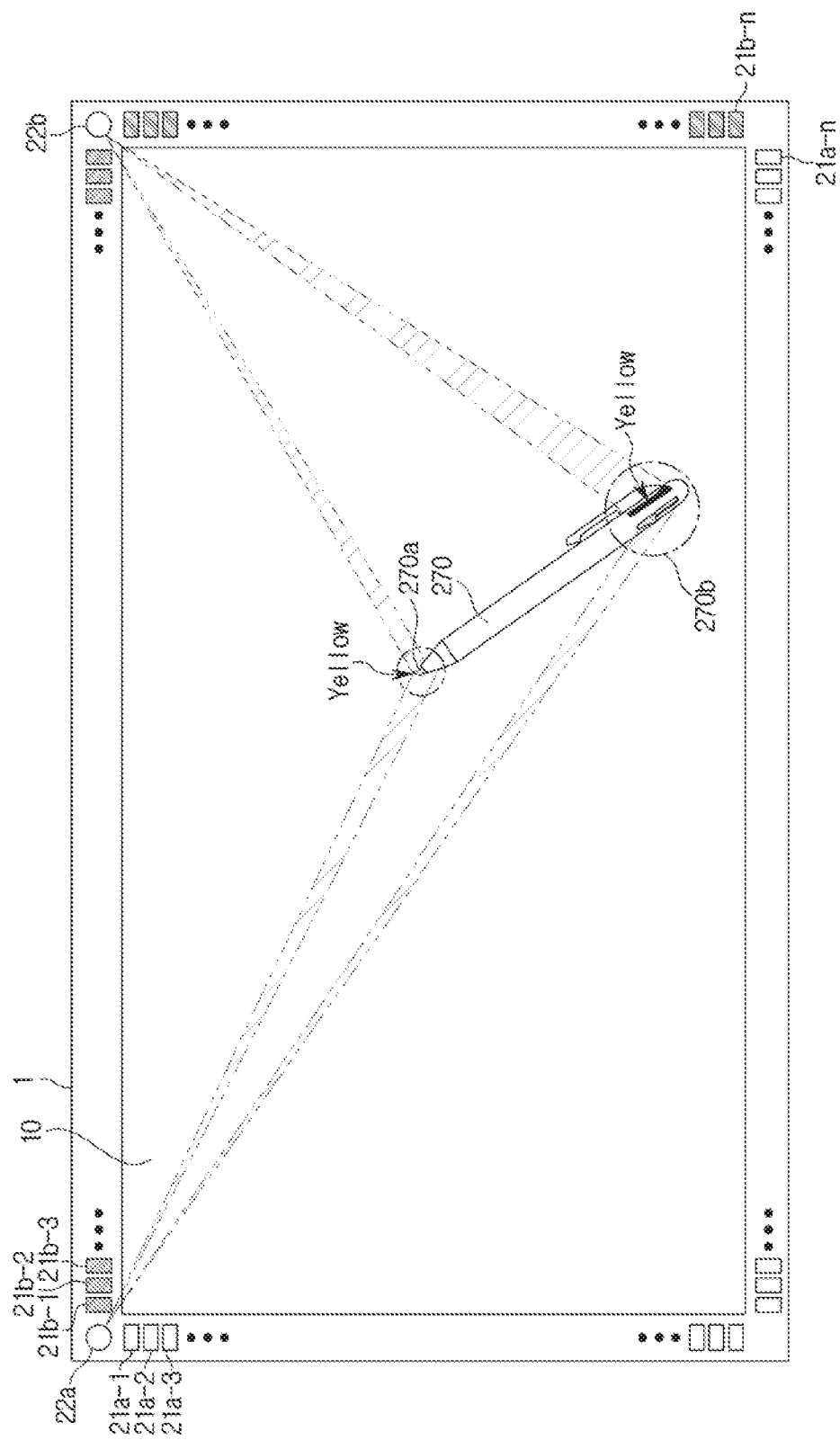

Referring to FIGS. 16 and 17, when an input tool 270 includes a plurality of colors, and the user can select a color of the input tool 270, the second sensor 22 may acquire the color information by recognizing all the colors of the input tool 270 that vary according to the user's selection.

The user can select the color of the input tool 270, and as shown in FIGS. 16 and 17, the input tool 270 has various colors in one pen.

Referring to FIG. 16, the user may select red from a plurality of colors included in the input tool 270 by manipulating a color selector 270b of the pen to select red and perform a touch input. A corresponding nib 270a may be selected to protrude out of the input tool 270.

The second sensor 22 may transmit the acquired color information to the controller 100 by detecting the red color of the color selector 270b and the red color of the nib 270a determined according to the user's selection.

The controller 100 may determine a red color corresponding to the color of the color selector 270b and the nib 270a of the input tool 270 as the color of the touch input which is input to the display 10 based on the detection result of the second sensor 22.

Referring to FIG. 17, the user may select yellow from a plurality of colors included in the input tool 270 by manipulating the color selector 270b of the pen to select yellow and perform the touch input. Accordingly, the nib 270a corresponding to yellow may be selected from the input tool 270 to protrude out of the input tool 270.

The second sensor 22 may transmit the acquired color information to the controller 100 by detecting the yellow color of the color selector 270b determined by the user's selection and the yellow color indicated by the nib 270a.

The controller 100 may determine a yellow color corresponding to the color of the color selector 270b and the pen lid 260a of the input tool 270 as the color of the touch input which is input to the display 10 based on the detection result of the second sensor 22.

The shape and thickness of the nib 270a included in the input tool 270 as shown in FIGS. 16 and 17 may be implemented in various forms, and the color included in the input tool 270 may have various embodiments.

Although, as shown in FIG. 2, the first sensor 21 and the second sensor 22 may be provided on the display 10 in a separate configuration, a sensor module 20 including the first sensor 21 and the second sensor 22 may be implemented as provided in the display 10 as shown in FIG. 3.

That is, as shown in FIG. 6, the sensor module 20: 20-1, 20-2, 20-3, . . . , 22-n may be implemented as provided in the display including the first sensor 21 and the second sensor 22: 22-1, 22-2, 22-3, . . . , 22-n including the infrared LED arrays 21a: 21a-1, 21a-2, . . . , 21-a-n and the optical receivers 21b: 21b-1, 21b-2, . . . , 21b-n. As such, the first sensor 21 and the second sensor 22 included in the input apparatus 1 for the disclosed embodiment may be implemented in various forms, and may be disposed at any position of the display 10.

Figure 18:
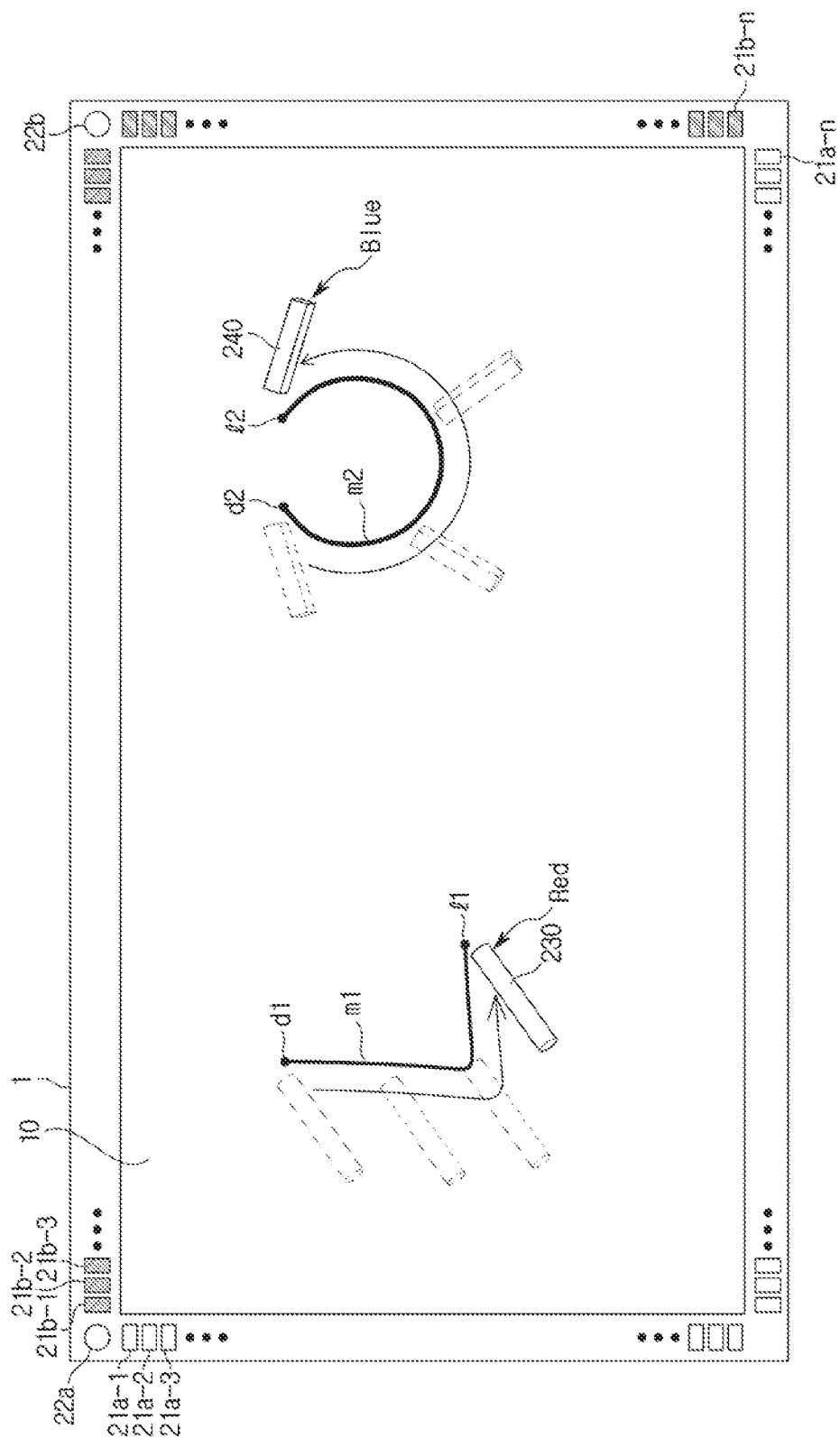
FIG. 18 is a diagram illustrating controlling to display a graphic in a color detected at a touch input time point of an input tool according to an embodiment.
Figure 19:
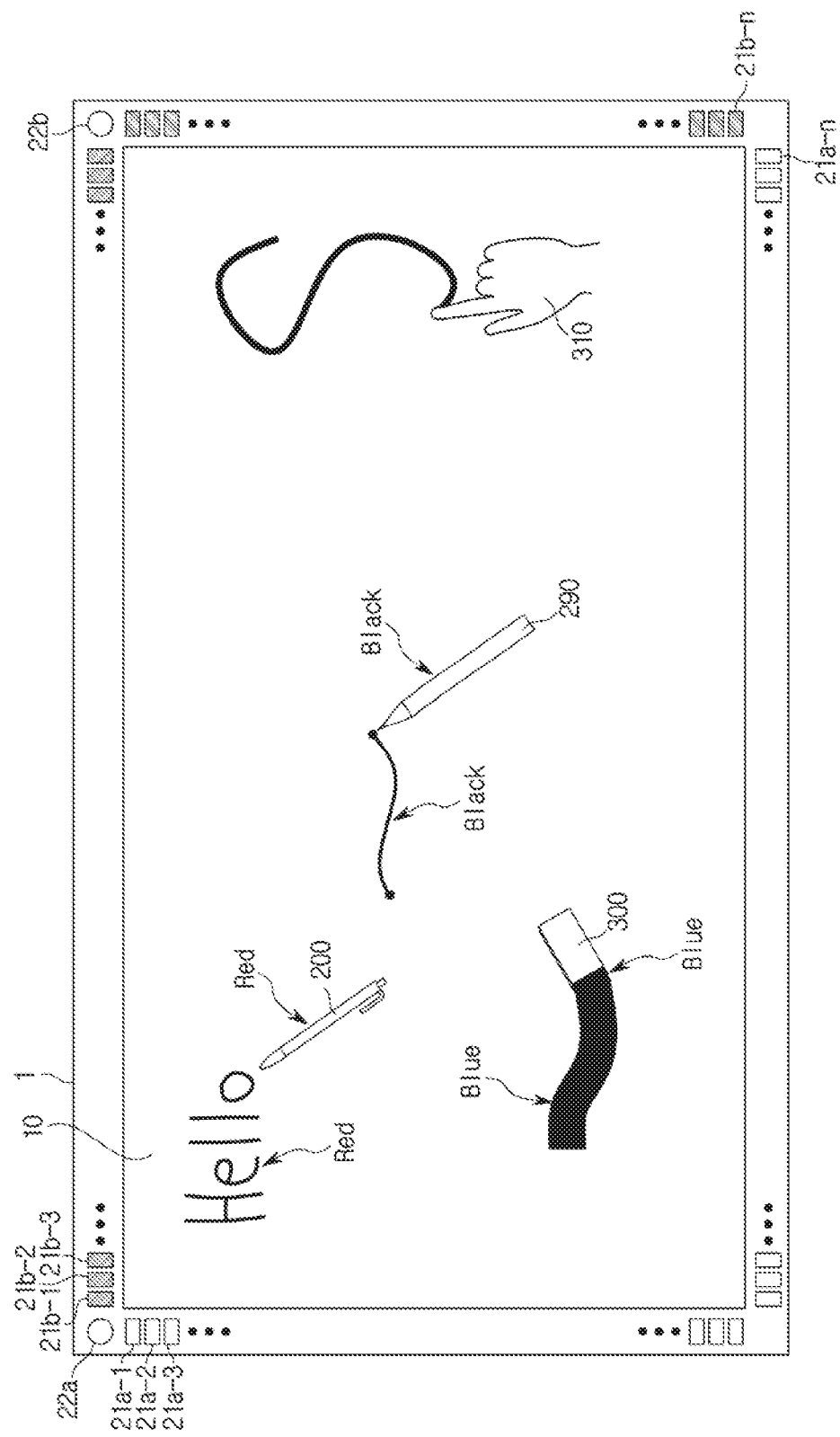
FIG. 19 illustrates that a graphic input through an input tool is displayed on a display unit according to an embodiment.

FIG. 18 is a diagram illustrating controlling to display a graphic in a color detected at a touch input time point of an input tool according to an embodiment. FIG. 19 illustrates that a graphic input through an input tool is displayed on a display unit according to an embodiment.

The controller 100 may determine a start point at which the input tool 200 is touched on the display 10 to input the touch command, and may determine a time point at which the input tool 200 is released from the display 10 to end the touch command input.

Referring to FIG. 18, the controller 100 may determine a time point at which the red input tool 230 touches a point d1 of the display 10 as a start time point at which a touch command is input. The time point at which the input tool 230 is released at a point l1 of the display 10 may be determined as the time point at which the touch command input ends.

The second sensor 22 may transfer the color information obtained by recognizing the color of the input tool 230 to the controller 100, and the controller 100 may control the touch command to be displayed on the display 10 in red, which is a color of the detected input tool 230.

In this case, when the start time point at which the touch command is input is determined, the controller 100 may control to display a graphic corresponding to the touch command input from the start time in the color of the input tool 230. For the touch command input from the start time point of the touch command to the end time point of the input, the graphic may be displayed in the color of the input tool 230 corresponding to the touch command.

That is, as shown in FIG. 18, the user may input a touch command to the display 10 using the input tools 230 and 240 having different colors, respectively. The second sensor 22 may detect the colors of the input tools 230 and 240 in response to the time when the touch command is started by touching each of the input tools 230 and 240 with the display 10.

When the user touches the display 10 with the red input tool 230 to input a touch command, the second sensor 22 may detect the color of the input tool 230 in response to the time point when the input tool 230 is touched at the point d1 of the display 10 to start the touch command.

When the user starts typing a touch command at the point d1 and maintains the touch to the point l1 to enter a constant graphic m1, the controller 100 may control the graphic corresponding to the letter m1 input from the touch command input start point at the point d1 to the end point of the touch command point at the point l1 to be displayed in red detected by the second sensor 22.

That is, the controller 100 may control the display color of the touch command inputted from the start time at which the touch command is input from the input tool 230 to the time at which the input tool 230 is released from the display 10 and the touch command input is terminated to be the color of the input tool 230 detected by the second sensor 22.

Likewise, when the user touches the display 10 with the blue input tool 240 to enter a touch command, the second sensor 22 may detect the color of the input tool 240 in response to the touch command being started by the touch of the input tool 240 at a time point d2 of the display 10.

When the user starts typing a touch command at the time point d2 and maintains the touch to a time point l2 to enter a constant graphic m2, the controller 100 may control the graphic corresponding to the letter m2 input from the touch command input start point at the time point d2 to the touch command end point at the l2 time point to be displayed in blue detected by the second sensor 22.

That is, the controller 100 may control a graphic displayed from the start time to the end time when the touch input of the input tools 230 and 240 inputted in the same color based on the colors of the input tools 230 and 240 sensed by the second sensor 22.

Referring to FIG. 19, the user may input a touch command to the display 10 of the input apparatus 1 through the various input tools 200.

The first sensor 21 detects the touch position of the touch command input to the display 10, and the second sensor 22 may detect the color of the input tool 200 for inputting a touch command and transmit the detected information to the controller 100.

Based on the touch position of the touch command detected by the first sensor 21 and the color of the input tool 200 detected by the second sensor 22, the controller 100 may control the graphic corresponding to the touch command input by the user to be displayed in the detected color at the detected touch position.

The first sensor 21 may acquire the trajectory information and the thickness information of the touch command in addition to the position at which the touch command is input, and the controller 100 may control the graphic corresponding to the touch command input by the user to be displayed on the display 10 based on the trajectory information and the thickness information acquired by the first sensor 21.

As shown in FIG. 19, the user may input a touch command using a red input tool 280. Based on the touch position of the touch command sensed by the first sensor 21, the trajectory information of the touch command, the thickness information, and the color of the input tool 280 detected by the second sensor 22, the controller 100 may control the graphic corresponding to the touch command input by the user with the red input tool 280 to be displayed in red at the touch position of the display 10.

In addition, the user may input a touch command using a black input tool 290. Based on the touch position of the touch command sensed by the first sensor 21, the trajectory information of the touch command, the thickness information, and the color of the input tool 290 detected by the second sensor 22, the controller 100 may control the graphic corresponding to the touch command input by the user with the black input tool 290 to be displayed in black at the touch position of the display 10.

In addition, the user may input a touch command using a blue input tool 300. Based on the touch position of the touch command sensed by the first sensor 21, the trajectory information of the touch command, the thickness information, and the color of the input tool 300 detected by the second sensor 22, the controller 100 may control the graphic corresponding to the touch command input by the user to the blue input tool 300 to be displayed in blue at the touch position of the display 10.

In addition, the user may input a touch command using a hand 310. Based on the touch position of the touch command sensed by the first sensor 21, the trajectory information of the touch command, the thickness information, and the color of the user's hand 310 detected by the second sensor 22, the controller 100 may control the graphic corresponding to the touch command input by the user to be displayed in the color corresponding to the color of the hand 310 at the touch position of the display 10.

The storage 90 may store data related to an equation and a control algorithm for controlling the input apparatus 1 according to an embodiment. The controller 100 may transmit a control signal for controlling the vehicle 1 according to the equation and the control algorithm.

The storage 90 may be implemented as at least one of a storage medium such as a nonvolatile memory device such as cache, read only memory (ROM), programmable ROM (PROM), erasable programmable ROM (EPROM), electrically erasable programmable ROM (EEPROM), and flash memory, or a volatile memory device such as random access memory (RAM), or a hard disk drive (HDD) or a CD-ROM, but is not limited thereto. The storage 90 may be a memory implemented as a separate chip from the processor described above with respect to the controller 100, or may be implemented as a single chip with the processor.

Figure 20:
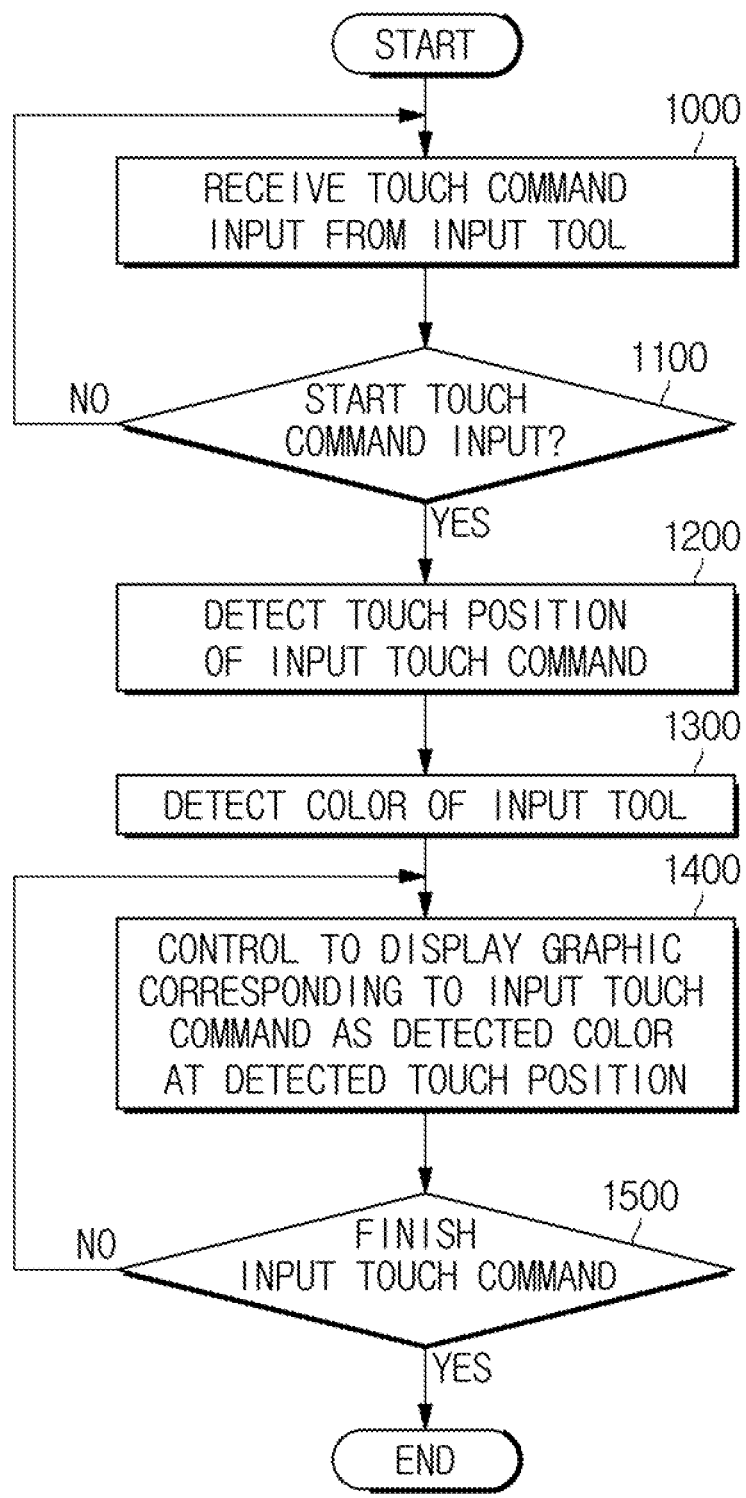
FIG. 20 is a flowchart illustrating a method of controlling an input device according to an embodiment.

FIG. 20 is a flowchart illustrating a method of controlling an input device according to an embodiment.

Referring to FIG. 20, the display 10 of the input apparatus 1 may receive a touch command from the user through the input tool 200 (1000).

The controller 100 may determine a start point at which the touch command is input by touching the input tool 200 on the display 10. Tat is, the controller 100 determines a start time at which the touch command is input to the display 10 (1100). When it is determined that the touch command is started, the first sensor 21 may be controlled to detect the touch position of the touch command input to the display 10 (1200).

The first sensor 21 may acquire the coordinate information of the position where the touch command is input, the trajectory information and the thickness information of the touch command may be obtained. That is, the first sensor 21 obtains the track information of the touch command based on the change of the coordinate of the touch command input through the input tool 200. The thickness information of the touch command may be obtained based on the width and length information of the touch command.

The second sensor 22 may detect a color of the input tool 200 for inputting a touch command (1300). That is, the second sensor 22 may acquire the color information by recognizing the color of the input tool 200.

The controller 100 may determine the color of the predetermined area of the input tool 200 as the color displayed at the touch position of the display 10 based on the color of the input tool 200 detected by the second sensor 22.

In addition, when the color of the input tool 200 detected by the second sensor 22 includes a plurality of colors, the controller 100 may determine a color of an area corresponding to a predetermined ratio or more among the areas of the input tool 200 as the color of the input tool 200.

The controller 100 may control the graphic corresponding to the touch command input by the user to the display 10 to be displayed in the detected color at the detected touch position (1400). According to the control of the controller 100, the graphic corresponding to the touch command input by the user may be displayed on the display 10 in a color corresponding to the color of the input tool 200.

The controller 100 may determine whether the input of the touch command is terminated (1500). When it is determined that the input tool 200 is released from the display 10 and the touch command input is terminated, the display of the graphic on the display 10 may be terminated.

Referring to the drawings illustrated as above, the input apparatus and its control method have been described with reference to the preferred embodiments. Examples of the input apparatus and its control method are not limited thereto, and the embodiments described above are exemplary in all respects. Therefore, it will be understood by those skilled in the art that the present invention may be implemented in other specific forms without changing the technical spirit or essential features thereof. The scope of the present invention is shown in the appended claims rather than the foregoing description, and all differences within the scope will be construed as being included in the present invention.

The invention claimed is:

1. An input apparatus comprising:
    a display;
    a first sensor configured to detect a touch position of a touch command input to the display from an input tool;
    a second sensor configured to detect a color of the input tool; and
    a controller configured to:
        based on the second sensor detecting a plurality of colors on the input tool, obtain, for each color of the input tool, a ratio of an area of the color to a total area of the input tool, and determine a color area having a ratio exceeding a predetermined ratio, among the color areas of the input tool, as the color of the input tool; and control a graphic corresponding to the touch command to be displayed in the color of the input tool at the detected touch position.

2. The input apparatus of claim 1, wherein the second sensor comprises a color sensor configured to obtain color information by recognizing the color of the input tool, and wherein the color sensor comprises at least one of a camera, a color filter, and a photodiode.

3. The input apparatus of claim 1, wherein the controller is further configured to determine a color of a predetermined area of the input tool as the color displayed at the touch position based on the color of the input tool detected by the second sensor.

4. The input apparatus of claim 1, wherein the first sensor is further configured to obtain coordinate information of a position at which the touch command is input.

5. The input apparatus of claim 1, wherein the first sensor is further configured to obtain trajectory information and thickness information of the input touch command.

6. The input apparatus of claim 5, wherein the first sensor is further configured to obtain the trajectory information of the touch command based on coordinate change of the input touch command, and the thickness information of the touch command based on width and length information of the input touch command.

7. The input apparatus of claim 1, wherein the controller is further configured to determine a start time point at which the touch command is input by the input tool being touched on the display, and determine an end time point at which the touch command is ended by the input tool being released from the display.

8. The input apparatus of claim 7, wherein the controller is further configured to, in response to determining the start time point at which the touch command is input, control the graphic corresponding to the touch command input from the start time point to be displayed in the detected color of the input tool at the detected touch position.

9. The input apparatus of claim 1, wherein the controller is further configured to control the graphic corresponding to the touch command input from an input start time point of the touch command to an input end time point of the touch command to be displayed in the detected color of the input tool.

10. The input apparatus of claim 1, wherein the controller is further configured to detect the color of the input tool in response to a time point when the touch command is touched by the input tool.

11. A method of controlling an input apparatus comprising:

inputting a touch command from an input tool;
detecting a touch position of the input touch command;
detecting a color of the input tool;
based on detecting a plurality of colors on the input tool, obtaining, for each color of the input tool, a ratio of an area of the color to a total area of the input tool, and determining a color area having a ratio exceeding a predetermined ratio, among the color areas of the input tool, as the color of the input tool; and controlling a graphic corresponding to the touch command to be displayed in the color of the input tool at the detected touch position.

12. The method of claim 11, wherein the detecting the color of the input tool comprises obtaining color information by recognizing the color of the input tool.

13. The method of claim 11, wherein the detecting the color of the input tool comprises determining a color of a predetermined area of the input tool as the color displayed at the touch position based on the color of the input tool detected by a second sensor.

* * * * *